US010757348B2

(12) United States Patent
Hatakeyama

(10) Patent No.: US 10,757,348 B2
(45) Date of Patent: Aug. 25, 2020

(54) IMAGE PICKUP APPARATUS, IMAGE PICKUP APPARATUS CONTROL METHOD AND COMPUTER-READABLE NON-TRANSITORY RECORDING MEDIUM RECORDING PROGRAM

(71) Applicant: Olympus Corporation, Hachioji-shi, Tokyo (JP)

(72) Inventor: Ryo Hatakeyama, Hino (JP)

(73) Assignee: Olympus Corporation, Tokyo (JP)

( * ) Notice: Subject to any disclaimer, the term of this patent is extended or adjusted under 35 U.S.C. 154(b) by 51 days.

(21) Appl. No.: 16/129,565

(22) Filed: Sep. 12, 2018

(65) Prior Publication Data

US 2019/0104261 A1 Apr. 4, 2019

(30) Foreign Application Priority Data

Oct. 4, 2017 (JP) .................................. 2017-194277

(51) Int. Cl.
| | |
|---|---|
| *H04N 5/341* | (2011.01) |
| *H04N 5/369* | (2011.01) |
| *H04N 5/347* | (2011.01) |
| *H04N 5/3745* | (2011.01) |
| *H04N 5/232* | (2006.01) |
| *H04N 5/225* | (2006.01) |

(52) U.S. Cl.
CPC .......... *H04N 5/341* (2013.01); *H04N 5/2254* (2013.01); *H04N 5/23212* (2013.01); *H04N 5/23245* (2013.01); *H04N 5/347* (2013.01); *H04N 5/36961* (2018.08); *H04N 5/37457* (2013.01)

(58) Field of Classification Search
CPC ............... H04N 5/341; H04N 5/36961; H04N 5/23245; H04N 5/232122
See application file for complete search history.

(56) References Cited

U.S. PATENT DOCUMENTS

2013/0329095 A1* 12/2013 Aoki ........................ G02B 7/34
348/241
2015/0296128 A1* 10/2015 Saito ................... H04N 5/23212
348/353

FOREIGN PATENT DOCUMENTS

JP 2012-155095 A 8/2012

* cited by examiner

*Primary Examiner* — Ahmed A Berhan
(74) *Attorney, Agent, or Firm* — John C. Pokotylo; Pokotylo Patent Services

(57) ABSTRACT

An image pickup apparatus including: an image pickup device including a pixel region in which image pixels corresponding to microlenses are arrayed in a matrix, each of the image pixels being divided into a plurality of focus detection pixels configured to generate respective photoelectric conversion signals; and a control circuit configured to control a cycle in a column direction of first rows in which photoelectric conversion signals in an image pixel are added up to generate an image pixel signal, and second rows in which both of a pair of the focus detection pixel signals or one of the pair of the focus detection pixel signals and the image pixel signal are generated and read, in a frame is provided.

17 Claims, 18 Drawing Sheets

FIG. 23

| MODE OF IMAGE PICKUP APPARATUS | ny/nx |
|---|---|
| STILL IMAGE SHOOTING | SMALL |
| MOVIE SHOOTING | LARGE |
| LV | LARGE |

FIG. 24

| FOCUS MODE | ny/nx |
|---|---|
| MF | SMALL |
| SAF | LARGE |
| CAF | LARGE |

IMAGE PICKUP APPARATUS, IMAGE PICKUP APPARATUS CONTROL METHOD AND COMPUTER-READABLE NON-TRANSITORY RECORDING MEDIUM RECORDING PROGRAM

CROSS REFERENCE TO RELATED APPLICATION

This application claims benefit of Japanese Application No. 2017-194277 filed in Japan on Oct. 4, 2017, the entire contents of which are incorporated herein by this reference.

BACKGROUND OF THE INVENTION

1. Field of the Invention

The present invention relates to an image pickup apparatus including image pixels each corresponding to a microlens and being divided into a plurality of focus detection pixels, an image pickup apparatus control method and a computer-readable non-transitory recording medium recording a program.

2. Description of the Related Art

Image pickup devices each including image pixels each corresponding to a microlens and being divided into a plurality of focus detection pixels so as to enable acquisition of phase difference detection information by the image pickup device alone have conventionally been proposed and commercialized.

For example, where each image pixel is divided into two focus detection pixels, if all the focus detection pixels are read, a number of pixels, the number being twice the number of image pixels, are read and a length of time of the reading becomes long, resulting in decrease in frame rate.

Therefore, for example, Japanese Patent Application Laid-Open Publication No. 2012-155095 describes a technique in which a focus adjustment region is determined in an image pickup device including pixels, each of the pixels being subjected to pupil division into a plurality of photoelectric conversion sections, and switching is made between inside the focus adjustment region in which respective image signals of the pixels resulting from the pupil division are outputted and outside the focus adjustment region in which image signals are added up for each pixel and the resulting signal is outputted, to reduce a length of time of reading of image signals from the image pickup device.

SUMMARY OF THE INVENTION

An image pickup apparatus according to an aspect of the present invention includes: an image pickup device including a pixel region in which image pixels corresponding to microlenses are arrayed in a matrix, each of the image pixels being divided into a plurality of focus detection pixels configured to perform photoelectric conversion of a light flux passing through a plurality of regions resulting from division of an exit pupil of a shooting optical system, to generate respective photoelectric conversion signals, each of the image pixels generating an image pixel signal and focus detection pixel signals based on the photoelectric conversion signals; and a control circuit configured to control a cycle in a column direction of first rows in which first reading is performed, the first reading including adding up all the photoelectric conversion signals generated in one of the image pixels to generate the image pixel signal and reading the generated image pixel signal only, and second rows in which second reading or third reading is performed, the second reading including generating both of a pair of the focus detection pixel signals in a pupil division direction based on the photoelectric conversion signals and reading both of the pair of the focus detection pixel signals, the third reading including generating and reading one of the pair of the focus detection pixel signals and the image pixel signal, in one frame.

An image pickup apparatus control method according to another aspect of the present invention is a method for controlling an image pickup apparatus including an image pickup device including a pixel region in which image pixels corresponding to microlenses are arrayed in a matrix, each of the image pixels being divided into a plurality of focus detection pixels configured to perform photoelectric conversion of a light flux passing through a plurality of regions resulting from division of an exit pupil of a shooting optical system, to generate respective photoelectric conversion signals, each of the image pixels generating an image pixel signal and focus detection pixel signals based on the photoelectric conversion signals, the method including: performing first reading including adding up all the photoelectric conversion signals generated in one of the image pixels to generate the image pixel signal and reading the generated image pixel signal only, in first rows; performing second reading or third reading, the second reading including generating both of a pair of the focus detection pixel signals in a pupil division direction based on the photoelectric conversion signals and reading both of the pair of the focus detection pixel signals, the third reading including generating and reading one of the pair of the focus detection pixel signals and the image pixel signal, in second rows; and controlling a cycle in a column direction of the first rows and the second rows in one frame.

A computer-readable non-transitory recording medium recording a program according to yet another aspect of the present invention is a computer-readable non-transitory recording medium recording a program for causing a computer to control an image pickup apparatus including an image pickup device including a pixel region in which image pixels corresponding to microlenses are arrayed in a matrix, each of the image pixels being divided into a plurality of focus detection pixels configured to perform photoelectric conversion of a light flux passing through a plurality of regions resulting from division of an exit pupil of a shooting optical system, to generate respective photoelectric conversion signals, each of the image pixels generating an image pixel signal and focus detection pixel signals based on the photoelectric conversion signals, the program causing the computer to: perform first reading including adding up all the photoelectric conversion signals generated in one of the image pixels to generate the image pixel signal and reading the generated image pixel signal only, in first rows; perform second reading or third reading, the second reading including generating both of a pair of the focus detection pixel signals in a pupil division direction based on the photoelectric conversion signals and reading both of the pair of the focus detection pixel signals, the third reading including generating and reading one of the pair of the focus detection pixel signals and the image pixel signal, in second rows; and control a cycle in a column direction of the first rows and the second rows in one frame.

BRIEF DESCRIPTION OF THE DRAWINGS

FIG. 23 is a table indicating an example of control of the ratio ny/nx of second rows in one cycle relative to a mode of the image pickup apparatus in Embodiment 1; and FIG. 24 is a table indicating an example of control of the ratio ny/nx of second rows in one cycle relative to a focus mode in Embodiment 1.

DETAILED DESCRIPTION OF THE PREFERRED EMBODIMENT

An embodiment of the present invention will be described below with reference to the drawings.

Embodiment 1

Figure 1:
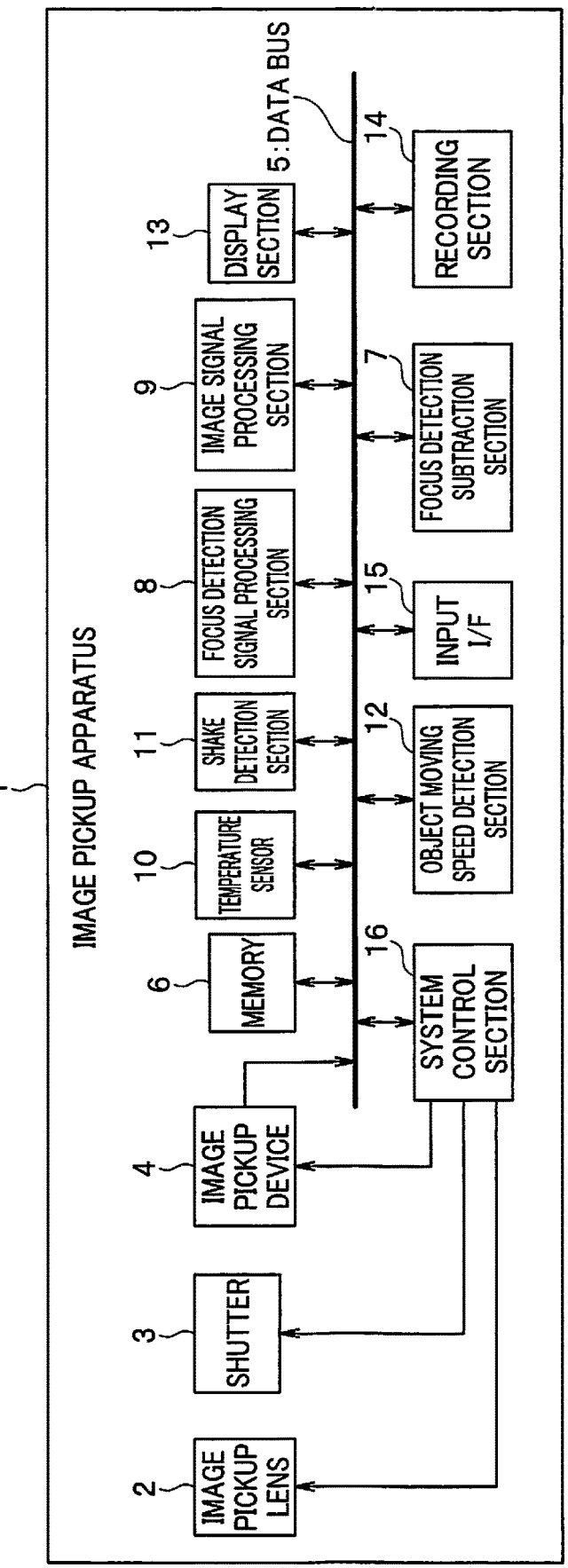
FIG. 1 is a block diagram illustrating a configuration of an image pickup apparatus according to Embodiment 1 of the present invention.

FIGS. 1 to 24 illustrate Embodiment 1 of the present invention, and FIG. 1 is a block diagram illustrating a configuration of an image pickup apparatus.

As illustrated in FIG. 1, an image pickup apparatus 1 includes an image pickup lens 2, a shutter 3, an image pickup device 4, a data bus 5, a memory 6, a focus detection subtraction section 7, a focus detection signal processing section 8, an image signal processing section 9, a temperature sensor 10, a shake detection section 11, an object moving speed detection section 12, a display section 13, a recording section 14, an input interface (input IF) 15 and a system control section 16, and has a function as what is called a camera.

The image pickup lens 2 is a shooting optical system for forming an optical image of an object on the image pickup device 4. The image pickup lens 2 includes a focus lens for adjusting a focal point and an optical diaphragm configured to control a range of light flux passing through the image pickup lens 2, and is configured as, for example, a focal length-changeable zoom lens. An optical state of the image pickup lens 2, the optical state including, for example, a focal point, an aperture size (f-number) of the optical diaphragm and a focal length, is changed by driving control by the system control section 16. The image pickup lens 2 may be of a fixed type or a replaceable type, and if the image pickup lens 2 is of a replaceable type, the system control section 16 obtains information on the optical state of the image pickup lens 2 by means of communication with the image pickup lens 2.

The shutter 3 is configured to control a length of time until a light flux from the image pickup lens 2 reaches the image pickup device 4, and is, for example, a mechanical shutter having a configuration that causes shutter curtains to move, for example, a focal-plane shutter. An opening/closing operation the shutter 3 is subject to driving control by the system control section 16.

The image pickup device 4 includes a pixel section 22 (see FIGS. 2 and 3), which is a pixel region in which a plurality of image pixels are arrayed in two dimensions (in a matrix), the pixel section 22 being included in an image pickup section. The image pixels correspond to respective microlenses L (see FIG. 4), and each image pixel is divided into a plurality of focus detection pixels. Here, each focus detection pixel is configured to perform photoelectric conversion of a light flux passing through a relevant region formed as a result of division of an exit pupil of the image pickup lens 2, which is a shooting optical system, into a plurality of regions, to generate a photoelectric conversion signal. Therefore, the pixel section 22 can be regarded as including a plurality of focus detection pixels arrayed in two dimensions (in a matrix).

Then, the image pickup device 4 performs photoelectric conversion of an optical image of an object formed by the image pickup lens 2 through the shutter 3 as described above under the control of the system control section 16 to generate a plurality of photoelectric conversion signals.

The image pickup device 4 is configured as, for example, a single-chip CMOS image pickup device having a primary color Bayer arrangement color filter, but as a matter of course, is not limited to such configuration.

In addition, the image pickup device 4 in the present embodiment is configured so that under the control of the system control section 16, a later-described device control section 29 (see FIG. 2) controls a cycle in a column direction to perform, in first rows, first reading including adding up all photoelectric conversion signals generated in one of the image pixels to generate an image pixel signal and reading the generated image pixel signal only, and to perform, in second rows, second reading or third reading, the second reading including generating both of a pair of focus detection pixel signals in a pupil division direction based on photoelectric conversion signals and reading both of the pair of focus detection pixel signals, the third reading including generating and reading one of the pair of focus detection pixel signals and the image pixel signal, in one frame.

For example, if a case where one image pixel is divided into two focus detection pixels configured to generate a pair of focus detection pixel signals $\alpha$, $\beta$ is taken as an example, in the first reading, only an image pixel signal $(\alpha+\beta)$ resulting from the pair of focus detection pixel signals $\alpha$, $\beta$ being added up is outputted and neither of the focus detection pixel signals $\alpha$, $\beta$ is outputted. Also, in the second reading, the pair of focus detection pixel signals $\alpha$, $\beta$ is outputted from the image pickup device 4. Furthermore, in the third reading, either one of the pair of focus detection pixel signals $\alpha$, $\beta$ (here, for example, the focus detection pixel signal $\alpha$) and the image pixel signal $(\alpha+\beta)$ resulting from the pair of focus detection pixel signals $\alpha$, $\beta$ being added up are outputted from the image pickup device 4.

Furthermore, the image pickup device 4 is capable of performing mix reading in which a plurality of image pixels of a same color are subjected to mixing processing (at least one of pixel addition and pixel decimation is performed to reduce the number of pixels to be outputted from the image pickup device 4) and reading. For the mixed processing, different numbers of image pixels to be mixed are set according to, e.g., cases where an image to be outputted from the image pickup device 4 is a live view (LV) image, a movie image or a still image.

The data bus 5 is a transfer path for transferring various types of data or control signals from respective sites to other sites inside the image pickup apparatus 1. The data bus 5 in the present embodiment is connected to the image pickup device 4, the memory 6, the focus detection subtraction section 7, the focus detection signal processing section 8, the image signal processing section 9, the temperature sensor 10, the shake detection section 11, the object moving speed detection section 12, the display section 13, the recording section 14, the input IF 15 and the system control section 16.

The memory 6 is a storage section configured to temporarily store a pixel signal generated by the image pickup device 4, and includes, for example, a dynamic random access memory (DRAM). The memory 6 is used as a work memory or an image buffer memory when respective sections in the image pickup apparatus 1 perform various types of processing, for example image processing or focus detection.

The focus detection subtraction section 7 is configured to, when the above-described third reading is performed, subtract one of a pair of focus detection pixel signals from an image pixel signal to generate the other of the pair of focus detection pixel signals (or "restore the other of the pair of focus detection pixel signals"). While in the above-described second reading, the focus detection pixel signals $\alpha$, $\beta$ outputted from the image pickup device 4 can be used for phase difference detection as they are, in the third reading, a focus detection pixel signal necessary for phase difference detection (focus detection pixel signal $\beta$ in the above-described example) lacks. Therefore, the focus detection subtraction section 7 conducts, for example, subtraction of $\{(\alpha+\beta)-\alpha\}$ to restore the focus detection pixel signal $\beta$. Therefore, the method of the third reading is referred to as "subtraction reading method", and the method of the second reading is referred to as "simple reading method". Also, in the first reading, no focus detection pixel signal is outputted, and thus, the method of the first reading is referred to as "no phase difference information-provided reading method".

The focus detection signal processing section 8 is configured to perform on-sensor phase difference detection, based on both of a pair of focus detection pixel signals outputted from the image pickup device 4 in the simple reading method or one of a pair of focus detection pixel signals outputted from the image pickup device 4 and the other of the pair of focus detection pixel signals, the other focus detection pixel signal being restore by the focus detection subtraction section 7, in the subtraction reading method.

Also, the focus detection signal processing section 8 in the present embodiment is capable of performing focus detection (contrast AF) based on contrast of image pixel signals in addition to focus detection (phase difference AF) in a phase difference detection method based on focus detection pixel signals.

Then, the focus detection signal processing section 8 calculates a lens control parameter for moving a focal point of the image pickup lens 2 to a focusing position based on a result of the focus detection. In addition, the focus detection signal processing section 8 can perform an arithmetic operation of the focus detection pixel signals to calculate, e.g., 3D information, a depth map or depth correction information, and if the focus detection signal processing section 8 performs such calculation, transmits a result of the calculation to the image signal processing section 9.

The image signal processing section 9 is configured to perform image processing of an image pixel signal outputted from the image pickup device 4 to generate an image for display and/or recording (for example, an image to be displayed on the display section 13 and/or an image to be recorded in the recording section 14).

Here, where a second row is subjected to the third reading, an image pixel signal $(\alpha+\beta)$ is outputted, but where second rows are subjected to the second reading, a pair of focus detection pixel signals $\alpha$, $\beta$ is outputted and no image pixel signal $(\alpha+\beta)$ is outputted. Therefore, if second rows are subjected to the second reading, the image signal processing section 9 also performs processing for adding up a pair of focus detection pixel signals $\alpha$, $\beta$ to generate an image pixel signal $(\alpha+\beta)$.

The image signal processing section 9 performs image processing (including what is called developing processing), for example, OB subtraction, white balance (WB) gain, demosaicking, noise reduction, color conversion, gamma conversion, enlargement/reduction in size, on the image pixel signal. Also, the image signal processing section 9 also calculates a brightness value of an object. Here, data compression/data expansion when a still image or a movie is recorded into or read from the recording section 14 may be performed by the image signal processing section 9 or a dedicated compression/expansion section may be provided.

The temperature sensor 10 is provided, for example, in the vicinity of the image pickup device 4 and is configured to measure a temperature inside the image pickup apparatus 1. The system control section 16 acquires the temperature measured by the temperature sensor 10 and performs control according to the temperature in such a manner as described later.

The shake detection section 11 is configured to detect, e.g., an acceleration rate or an angular rate accompanying movement of the image pickup apparatus 1, and consequently detect a moving speed of the image pickup apparatus 1. The system control section 16 acquires the moving speed of the image pickup apparatus 1 detected by the shake detection section 11, and performs control according to the moving speed of the image pickup apparatus 1 in such a manner as described later.

The object moving speed detection section 12 is configured to detect a moving speed of an object based on an image acquired from the image pickup device 4. For example, the object moving speed detection section 12 detects a moving speed of an object in a direction intersecting with an optical axis of the image pickup lens 2 by recognizing the object in a plurality of images, respective shooting times of which are continuous with one another, and obtaining a motion vector of the object. Furthermore, the object moving speed detection section 12 detects a moving speed of an object in an optical axis direction of the image pickup lens 2 by recognizing the object in a plurality of images, respective shooting times of which are continuous with one another, and obtaining an amount of variation in amount of defocusing of the object part. Furthermore, as necessary, the object moving speed detection section 12 performs correction of the detected moving speed of the object based on the moving speed of the image pickup apparatus 1 detected by the shake detection section 11.

The system control section 16 is a control circuit, and acquires the moving speed of the object detected by the object moving speed detection section 12 and performs control according to the moving speed of the object in such a manner as described later.

The display section 13 is a display apparatus configured to display an image as well as various types of information relating to the image pickup apparatus 1. The display section 13 includes, for example, a device such as an LCD panel or an organic electroluminescence (organic EL) display. Examples of specific arrangement and configuration of the display section 13 include, e.g., an electronic viewfinder (EVF), a back panel of the image pickup apparatus 1 and a display apparatus of a mobile device wirelessly connected to the image pickup apparatus 1. Accordingly, the display section 13 is not limited to a configuration particular to the image pickup apparatus 1.

The recording section 14 is a recording medium configured to store image data (e.g., still image data or movie data) including a plurality of pixel signals in a non-volatile manner, and is formed by, for example, a flash memory incorporated in a body of the image pickup apparatus 1 or a memory card detachably attached to the body of the image pickup apparatus 1. Therefore, the recording section 14 is not limited to a configuration particular to the image pickup apparatus 1.

The input IF 15 is provided for performing various types of manual inputs to the image pickup apparatus 1. The input IF 15 includes, for example, a power supply button for turning on/off power of the image pickup apparatus 1, a release button including, for example a two-stage switch (a first release (1R) switch and a second release (2R) switch) for giving an instruction to start shooting of, e.g., a still image, a movie button for giving an instruction to perform shooting of a movie, a reproduction button for reproducing a recorded image, a menu button for making, e.g., settings of the image pickup apparatus 1, arrow keys to be used for item selection operation and manual operation button such as an OK button to be used for selected item determination operation.

Here, items that can be set using, e.g., the menu button, the arrow keys and/or the OK button include, for example, a shooting mode (e.g., a still image mode or a moving image mode), a continuous shooting mode or a single shooting mode in the still image mode, a recording mode (e.g., JPEG recording or RAW+JPEG recording), a reproduction mode, a focus mode (a manual focus (MF) mode, a single auto focus (SAF) mode or a continuous auto focus (CAF) mode).

Upon the input IF 15 being operated, a signal according to a content of the operation is outputted to the system control section 16.

Here, examples of specific arrangement and configuration of the input IF 15 include, e.g., a button, a switch or the like disposed at an exterior of a body of the camera, a touch panel provided in a display surface of the back panel in the display section 13, a remote release apparatus for remote control and a mobile device. Therefore, the input IF 15 is not limited to a configuration particular to the image pickup apparatus 1.

The system control section 16 includes, for example, a CPU, and is a control circuit configured to comprehensively control the respective sections inside the image pickup apparatus 1.

The system control section 16 executes various types of sequences in response to manual inputs to the input IF 15, according to a predetermined processing program (including an image pickup program). Here, the processing program may be stored in the system control section 16 in a non-volatile manner, or may be stored in the memory 6 in a non-volatile manner and read by the system control section 16.

For example, the system control section 16 controls the focus lens of the image pickup lens 2 based on the lens control parameter calculated by the focus detection signal processing section 8, controls the diaphragm of the image pickup lens 2 and the shutter 3 based on a result of exposure calculation performed in the system control section 16, and control the image pickup device 4 to pick up an image and output a resulting pixel signal. The system control section 16 also performs, e.g., control for displaying various types of information on the display section 13 and control for recording data into the recording section 14 or reading data from the recording section 14.

Furthermore, the system control section 16 grasps power consumption of the image pickup apparatus 1, controls a reading frame rate of the image pickup device 4 according to a processing program, and acquires the brightness value of the object from the image signal processing section 9.

The image pickup apparatus 1 can select either of the still image mode and the moving image mode as the shooting mode. In the still image mode, the image pickup apparatus 1 operates in a still image shooting mode from turning-on of the second release (2R) switch to acquisition of a still image (that is, during actual still image shooting), and operates in a live view (LV) mode in the rest of the time. Also, in the moving image mode, the image pickup apparatus 1 operates in a movie shooting mode from turning-on of the movie button to turning-off of the movie button (that is, during actual movie shooting (during movie recording)) and operates in the live view (LV) mode in the rest of the time. Therefore, a mode of the image pickup apparatus 1 can be set to any of the still image shooting mode, the movie shooting mode and the live view (LV) mode.

Furthermore, a focus mode of the image pickup apparatus 1 can be set to any of the manual focus (MF) mode, the single auto focus (SAF) mode and the continuous auto focus (CAF) mode.

Then, the system control section 16 sets the mode of the image pickup apparatus 1 to either of the still image mode (the still image shooting mode or the LV mode) and the moving image mode (the movie shooting mode or the LV mode) and sets the focus mode to any of the MF mode, the SAF mode and the CAF mode, in response to manual inputs from the input IF 15.

In addition, the system control section 16 is configured to determine the mode of the image pickup apparatus 1 (for example, the still image shooting mode, the movie shooting mode or the focus mode) based on, e.g., an input to the input IF 15 and transmits a cycle setting value for controlling a cycle in the column direction of first rows and second rows in one frame according to the determined mode, to the device control section 29 (see FIG. 2) in the image pickup device 4.

Figure 2:
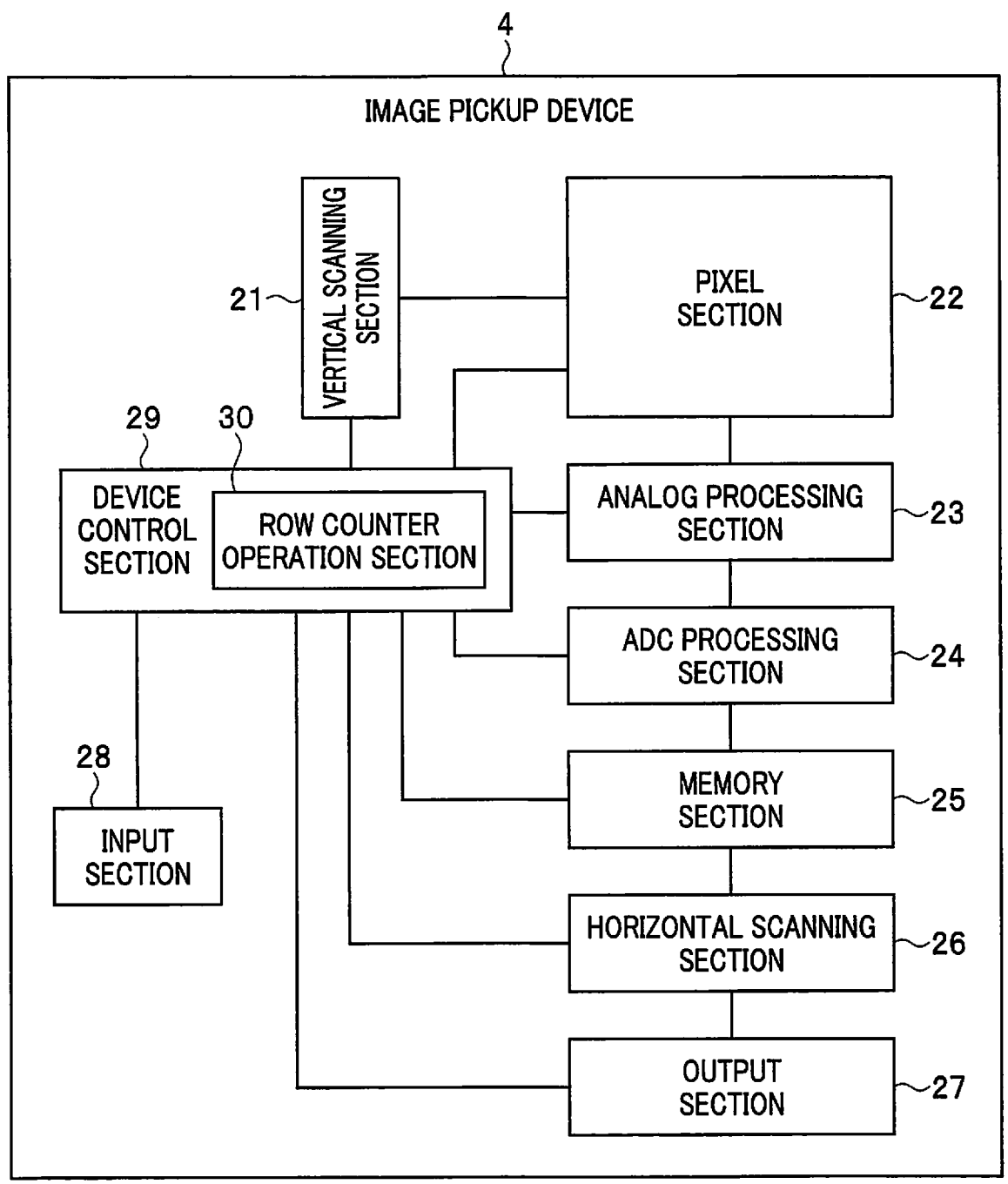
FIG. 2 is a block diagram illustrating a configuration of an image pickup device according to Embodiment 1.

Next, FIG. 2 is a block diagram illustrating a configuration of the image pickup device 4.

The image pickup section includes image pixels, each of which is divided into a plurality of focus detection pixels, and is configured to generate image pixel signals and focus detection pixel signals based on photoelectric conversion signals generated by photoelectric conversion of a light flux by the focus detection pixels, and as described above, includes the image pickup device 4.

In the example illustrated in FIG. 2, the image pickup device 4 includes a vertical scanning section 21, the pixel section 22, an analog processing section 23, an ADC processing section 24, a memory section 25, a horizontal scanning section 26, an output section 27, an input section 28 and a device control section 29.

The image pixels (thus, the focus detection pixels) are arrayed in the pixel section 22, and generation of image pixel signals and focus detection pixel signals based on photoelectric conversion signals and mix reading of a plurality of image pixels of a same color is performed by, e.g., at least some of the sections ranging from the vertical scanning section 21 to the output section 27 and the device control section 29.

FIG. 2 indicates an example configuration in which the image pickup device 4 includes not only the vertical scanning section 21 and the pixel section 22 but also the sections ranging from the analog processing section 23 to the device control section 29, but the present invention is not limited to this configuration, and one or more of the sections ranging from the analog processing section 23 to the device control section 29 may be arranged outside the image pickup device 4.

As described above, the pixel section 22 is a pixel array section in which the image pixels (thus, the focus detection pixels) are arrayed in a matrix (vertical direction (column direction) and a horizontal direction (row direction)).

Figure 3:
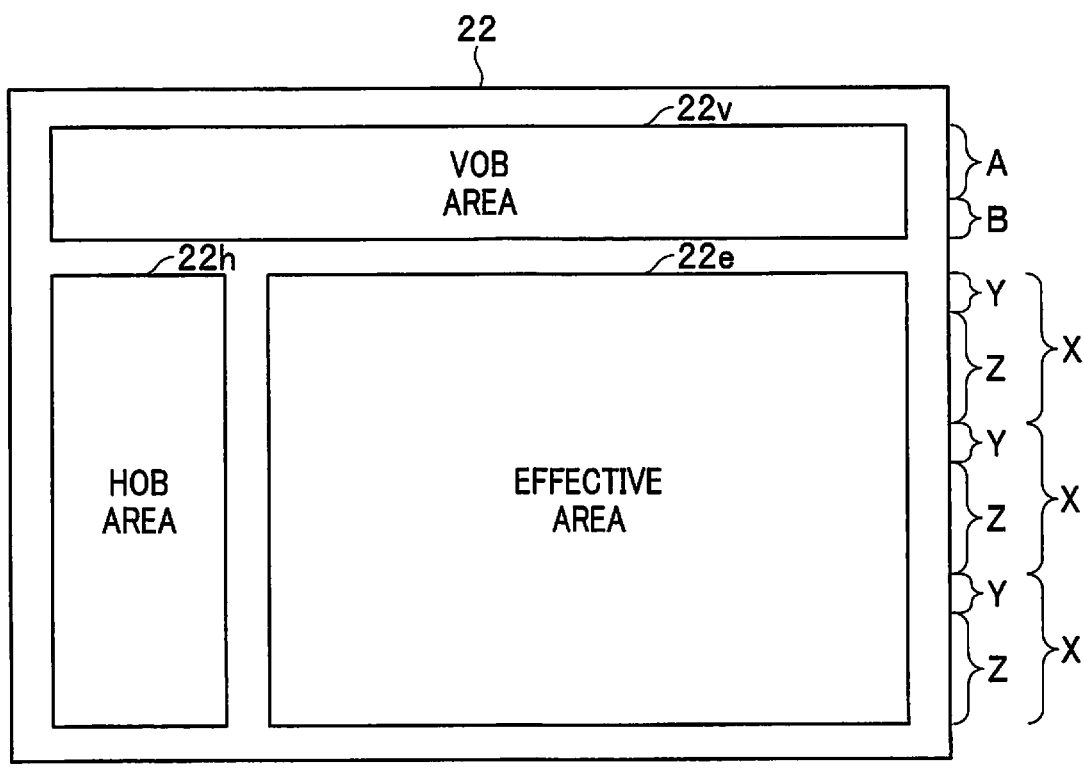
FIG. 3 is a diagram illustrating an example of an area configuration in a pixel section of the image pickup device according to Embodiment 1.

Here, FIG. 3 is a diagram illustrating an example of an area configuration in the pixel section 22 of the image pickup device 4.

A pixel section 22, which is a pixel region, includes an effective area 22e, which is an effective pixel region that a light flux from the image pickup lens 2 reaches, a VOB area 22v provided in rows that are different from rows of the effective area 22e, the VOB area 22v being a vertical optical black region in which a light flux from the image pickup lens 2 is blocked of; and an HOB area 22h provided in columns that are different from columns of the effective area 22e, the HOB area 22h being a horizontal optical black region in which a light flux from the image pickup lens 2 is blocked off.

Figure 4:
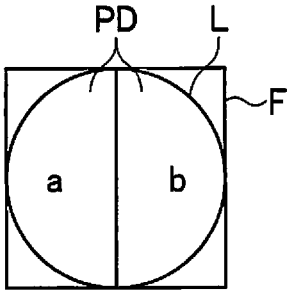
FIG. 4 is a table illustrating example pixel structures in which two or four photodiodes are arranged for one microlens in Embodiment 1.

Furthermore, FIG. 4 is a table indicating an example pixel structures in which two or four photodiodes PD are arranged for one microlens L.

As example image pixel structures, FIG. 4 illustrates a 2PD pixel structure in which two photodiodes PD are arranged for one microlens L and a 4PD pixel structure in which four photodiodes PD are arranged for one microlens L.

Each pixel has a configuration in which a microlens L, a color filter F and photodiodes PD are disposed in order in a stacking direction from the object side toward the image side. Here, the microlens L is configured to increase an amount of light reaching the image pixel and thus substantively increase an aperture ratio of the image pixel. Also, in the case of, for example, a primary color Bayer arrangement color filter, as the color filter F, any of an R filter, a G filter and a B filter is disposed according to a position of the pixel.

Here, in the case of the 2PD pixel structure illustrated in FIG. 4, two photodiodes PD are disposed in a range of an image formed via one microlens L. The two photodiodes PD are separated to the right and the left where the two photodiodes PD are provided to detect a phase difference in the horizontal direction, and the two photodiodes PD are separated to the top and the bottom where the two photodiodes PD are provided to detect a phase difference in the vertical direction. Consequently, two focus detection pixels a, b are configured.

On the other hand, in the case of the 4PD pixel structure in FIG. 4, four photodiodes PD are disposed in a range of an image formed via one microlens L. The four photodiodes PD are separated to the top, the bottom, the right and the left so that phase differences in the horizontal direction and the vertical direction can be detected (that is, the four photodiodes PD are arranged at upper right, lower right, upper left and lower left positions, respectively). Consequently, four focus detection pixels a, b, c, d are configured.

In the following, the description will be given taking a case where all pixels in the pixel section 22 have a 4PD pixel structure as an example (however, the description is not intended to prevent some of the pixels in the pixel section 22 from having a 4PD pixel structure or a 2PD pixel structure). Here, where all the pixels in the pixel section 22 have a 4PD pixel structure, pixel signals outputted from the respective photodiodes PD are focus detection pixel signals.

Furthermore, where outputs of the photodiodes PD are subjected to, for example, vertical two pixel addition by the later-described circuit configuration in FIG. 5, that is, where (a+b) and (c+d) in FIG. 4 are calculated, focus detection pixel signals for detecting a phase difference in the horizontal direction (vertical line detection) are obtained.

Likewise, where outputs of the photodiodes PD are subjected to horizontal two pixel addition, that is, where (a+c) and (b+d) in FIG. 4 are calculated, focus detection pixel signals for detecting a phrase difference in the vertical direction (horizontal line detection) are obtained.

In the case of the 4PD pixel structure illustrated in FIG. 4, one of the focus detection pixel signals for vertical line detection and the focus detection pixel signals for horizontal line detection is a pair of focus detection pixel signals in a first pupil division direction, and the other is a pair of focus detection pixel signals in a second pupil division direction.

In addition, where outputs of the photodiodes PD are subjected to four pixel addition in a manner that is similar to the above, that is, where (a+b+c+d) in FIG. 4 is calculated, an image pixel signal is obtained.

The vertical scanning section 21 is a circuit configured to sequentially select horizontal lines (rows) of pixels in the pixel section 22 to perform scanning in the vertical direction. The vertical scanning section 21 is configured to select a specific row and reset or transfer respective pixels in the selected row to control a charge accumulation time length (exposure time length) for the pixels.

The analog processing section 23 is a circuit configured to subject analog pixel signals read from the pixel section 22 to analog signal processing. The analog processing section 23 includes, for example, a preamplifier configured to amplify pixel signals, an OB clamping circuit configured to correct pixel signals obtained in the effective area 22e, based on pixel signals obtained in the VOB area 22v or the HOB area 22h to adjust a black level and also remove, e.g., fixed pattern noise, and a correlated double sampling (CDS) circuit configured to reduce reset noise of pixel signals.

The analog-digital conversion processing section (ADC processing section) 24 converts analog pixel signals outputted from the analog processing section 23 to digital pixel signals. The ADC processing section 24 employs a configuration in which pixel signals read from the pixel section 22 are subjected to AD conversion by analog-digital converters (ADCs) for respective columns such as represented by, for example, column ADCs.

The memory section 25 includes, e.g., a volatile memory circuit configured to temporarily hold the pixel signals subjected to the conversion in the ADC processing section 24.

The horizontal scanning section 26 reads the pixel signals (image pixel signals and focus detection pixel signals) in order of columns from the memory section 25.

The output section 27 aligns the pixel signals read from the horizontal scanning section 26 to generate a pixel signal string and converts the pixel signal string into an output signal form such as a serial signal or a differential signal and outputs the resulting signal.

The input section 28 receives, e.g., a synchronization signal, reference clocks and operation setting information (for example, the still image shooting mode, the movie shooting mode or the live view mode, a camera mode such as the AF mode, and the above-described cycle setting value) relating to control of the image pickup device 4, from the system control section 16.

The device control section 29, which is a control circuit, is configured to control the respective blocks in the image pickup device 4 based on the operation setting information, in accordance with the synchronization signal and the reference clocks received via the input section 28, and includes a row counter operation section 30.

The row counter operation section 30 determines which rows are to be set as first rows in which the first reading is performed and determines the rest of the rows as second rows, based on the cycle setting value received via the input section 28. Then, the row counter operation section 30 counts read rows, and performs control so as to if a counted row is a first row, perform the first reading for the counted row, and if a counted row is not a first row, perform, for example, the third reading (which may be the second reading, but in the following, an example in which the third reading is performed will be described).

Consequently, a control circuit configured to control reading from the image pickup section (which corresponds to the image pickup device 4 in the example in FIG. 2) is configured by, e.g., the device control section 29 including the row counter operation section 30 and the system control section 16 illustrated in FIG. 1.

Figure 5:
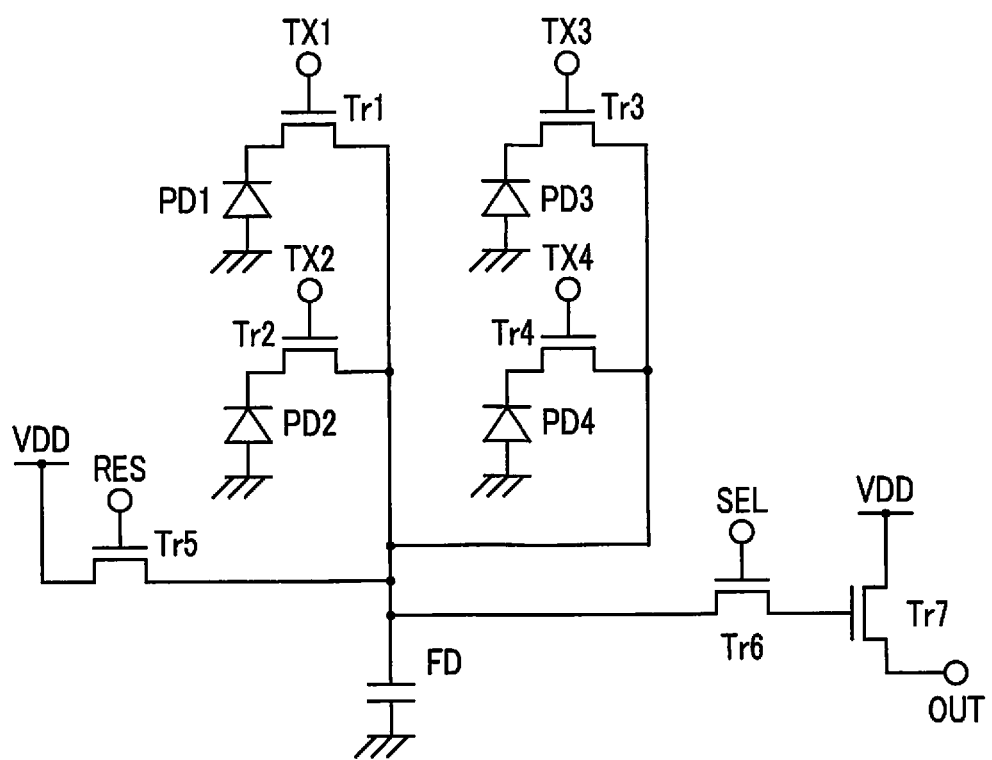
FIG. 5 is a circuit diagram illustrating an example configuration of a pixel having a 4PD pixel structure in Embodiment 1.

Next, FIG. 5 is a circuit diagram illustrating an example configuration of a pixel having a 4PD pixel structure.

In a pixel having a 4PD pixel structure, four photodiodes PD1 to PD4 are arranged at respective positions corresponding to one microlens L, and more specifically, four photodiodes PD1 to PD4 are arranged at upper left, lower left, upper right and lower right positions in a range of formation of an optical image via a microlens L, respectively.

Transistors Tr1 to Tr4 each configured to function as a switch are connected to the four photodiodes PD1 to PD4, respectively, and turning-on/off of the transistors Tr1 to Tr4 is controlled by application of respective control signals TX1 to TX4 from the vertical scanning section 21.

The transistors Tr1 to Tr4 are each connected to a floating diffusion FD, and upon a transistor Tr being turned on, signal charge in a photodiode PD corresponding to the transistor Tr is transferred to the floating diffusion FD.

Also, one end of a transistor Tr5 configured to function as a switch is connected to the floating diffusion FD, and the other end of the transistor Tr5 is connected to a power supply voltage VDD. Then, connection/disconnection between the power supply voltage VDD side and the floating diffusion FD side is controlled by applying a reset signal RES to the transistor Tr5. With such configuration as above, upon the transistor Tr5 being turned on, the floating diffusion FD is reset. Also, in a state in which the transistors Tr1 to Tr4 are on, upon the transistor Tr5 being further turned on, the photodiodes PD1 to PD4 are reset.

The floating diffusion FD is connected to an output terminal OUT via a transistor Tr6 configured to function as a switch and a transistor Tr7 connected to a power supply voltage VDD and configured to function as an amplification section.

Upon application of a selection signal SEL to the transistor Tr6, a voltage value of the floating diffusion FD is amplified by the transistor Tr7 and read from the output terminal OUT.

A timing chart relating to the first reading will be described with reference to FIGS. 6 and 7.

Figure 6:
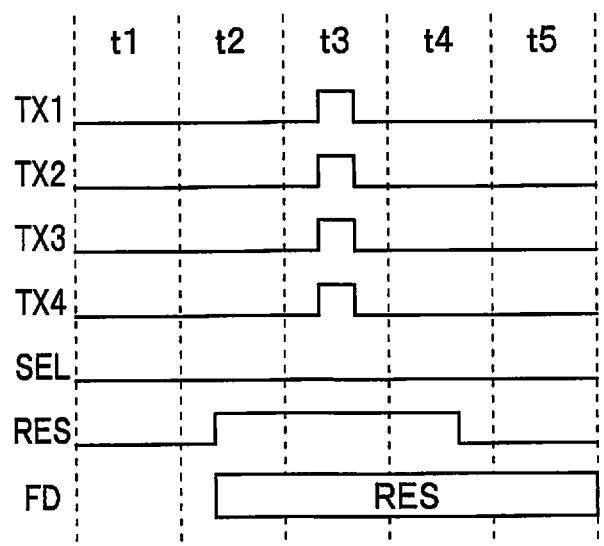
FIG. 6 is a timing chart indicating an example of driving of the image pickup device when an electronic shutter operation in first reading is performed, in Embodiment 1.

FIG. 6 is a timing chart indicating an example of driving of the image pickup device 4 when an electronic shutter operation in the first reading is performed. Note that timings t1 to t5 in FIG. 6 (and FIG. 7 referred to later) (and timings t1 to t10 in FIGS. 8 to 10 referred to later) indicate a temporal relationship among the timings in one timing chart and even if a same reference numeral (for example, t1) is included in different timing charts, the same reference numerals in the timing charts are not intended to represent a same time.

At a timing t2, upon the reset signal RES being turned on (it is assumed that from among the transistors Tr1 to Tr6 each configured to function as a switch, transistors other than a transistor clearly indicated as being on are off. The same applies to the following), the floating diffusion FD is reset. The reset signal RES is kept on until the reset signal RES is turned off at a timing t4.

At a timing t3, upon the control signals TX1 to TX4 being turned on, at this point of time, the reset signal RES is on, and thus, signal charges in the photodiodes PD1 to PD4 are further reset.

Subsequently, at a timing t4, the reset signal RES is turned off.

In the flow indicated in FIG. 6, no charge is transferred from the photodiodes PD1 to PD4 to the floating diffusion FD, and thus, at the timing t2 onwards, the floating diffusion FD holds a reset charge (indicated as "RES" in the timing chart).

Figure 7:
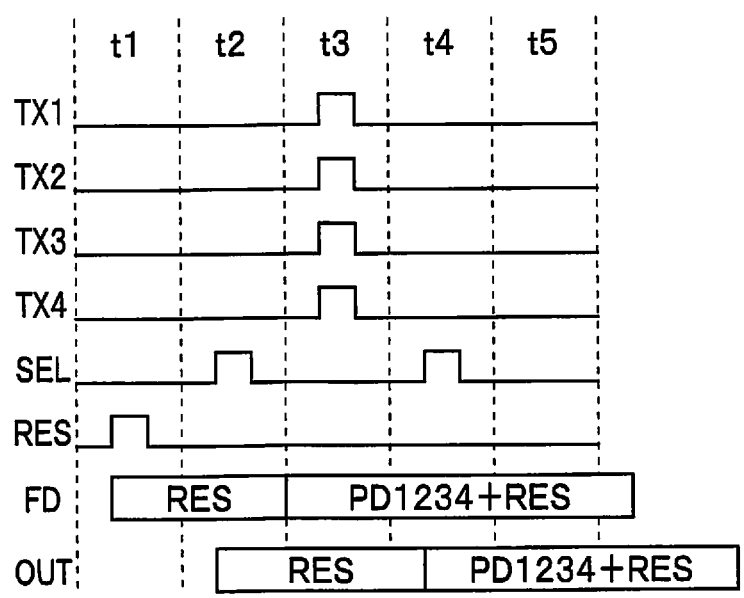
FIG. 7 is a timing chart indicating an example of driving of the image pickup device when pixel signal reading in first reading is performed, in Embodiment 1.

FIG. 7 is a timing chart indicating an example of driving of the image pickup device 4 when pixel signal reading in the first reading is performed. FIG. 7 indicates a pixel signal reading operation performed after a lapse of the exposure time length from an electronic shutter operation such as illustrated in FIG. 6 (corresponding to what is called a shutter speed). Therefore, an electronic shutter operation can be regarded as a front curtain operation to start an exposure, and a reading operation can be regarded as a rear curtain operation to end the exposure (the same applies to the following).

At a timing t1, upon the reset signal RES being turned on, the floating diffusion FD is reset. Then, the floating diffusion FD holds a reset charge (RES).

At a timing t2, upon the selection signal SEL being turned on, a voltage (reset voltage) of the reset charge (RES) accumulated in the floating diffusion FD is amplified by the transistor Tr7 and read from the output terminal OUT.

At a timing t3, upon the control signals TX1 to TX4 being turned on, signal charges in the photodiodes PD1 to PD4 (these signal charges are indicated as PD1 to PD4) are transferred to the floating diffusion FD. Consequently, the floating diffusion FD holds the resulting charge (PD1234+ RES (here, PD1234=PD1+PD2+PD3+PD4)).

At a timing t4, upon the selection signal SEL being turned on, a voltage of the charge (PD1234+RES) accumulated in the floating diffusion FD is read from the output terminal OUT in such a manner as described above. A reset voltage (reset noise) included in the voltage read at the timing t4 is removed using the reset voltage read at the timing t2, by the CDS circuit of the analog processing section 23 (hereinafter, reset noise is removed in a manner similar to the above although description of such removal is omitted).

Subsequently, timing charts for the third reading will be described with reference to FIGS. 8, 9 and 10. Here, although description of the second reading is omitted for simplicity, the second reading can be performed in a manner similar to the above by controlling a circuit such as illustrated in FIG. 5.

Figure 8:
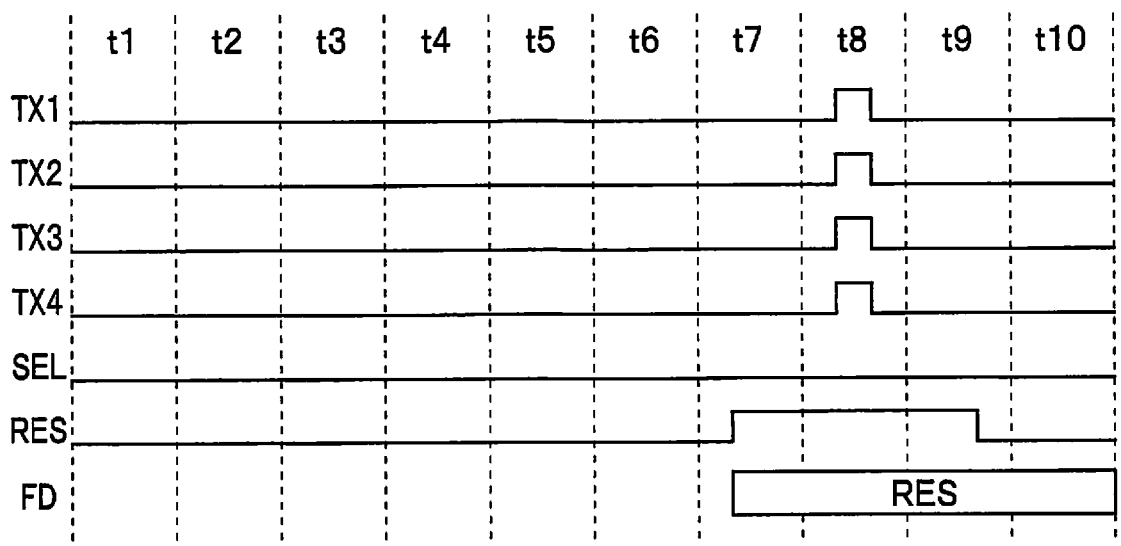
FIG. 8 is a timing chart indicating a first example of driving of the image pickup device when an electronic shutter operation in third reading is performed, in Embodiment 1.

FIG. 8 is a timing chart indicating a first example of driving of the image pickup device 4 when an electronic shutter operation in the third reading is performed. Description of points in FIGS. 8 to 10 that are similar to points in FIG. 6 or 7 will arbitrarily be omitted, and description will more briefly be given below.

At a timing t7, the reset signal RES is turned on, and the reset signal RES that is on is turned off at a timing t9. Then, at a timing t8 at which the reset signal RES is on, the control signals TX1 to TX4 are turned on to reset signal charges in the photodiodes PD1 to PD4.

Figure 9:
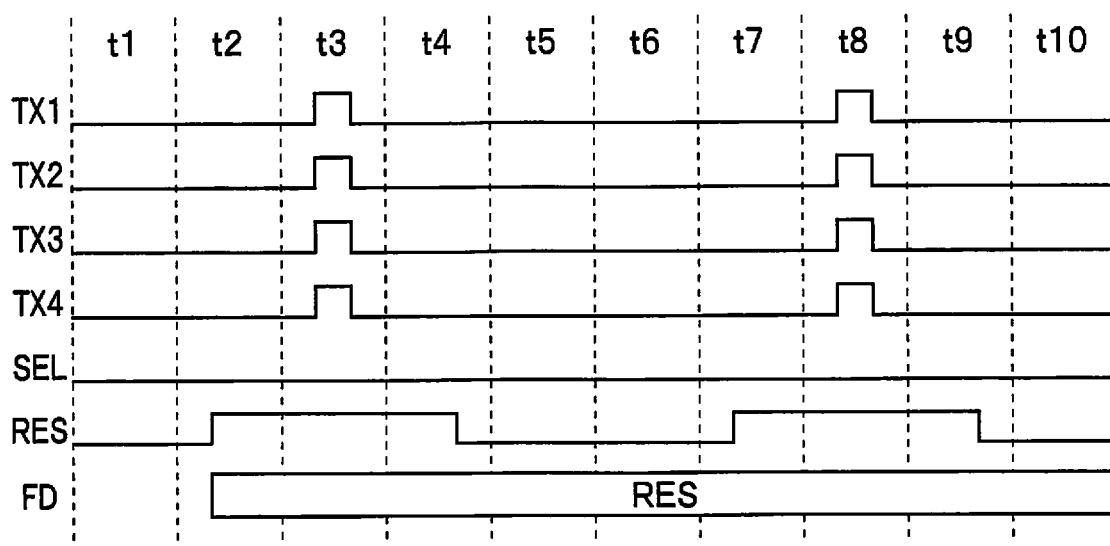
FIG. 9 is a timing chart indicating a second example of driving of the image pickup device when an electronic shutter operation in third reading is performed, in Embodiment 1.

FIG. 9 is a timing chart indicating a second example of driving of the image pickup device 4 when an electronic shutter operation in the third reading is performed. As described later with reference to FIG. 10, in pixel signal reading in the third reading, reading of signal charges in the photodiodes PD1, PD2 at a timing t3 and reading of signal charges in the photodiodes PD1 to PD4 at a timing t8 are performed. Therefore, the electronic shutter operation in FIG. 9 is arranged so that resetting of the photodiodes PD1 to PD4 in an electronic shutter operation is performed twice, that is, at the timings t3 and t8, to make variation of the power supply voltage VDD constant (steady).

In other words, at a timing t2, the reset signal RES is turned on and the reset signal RES that is on is turned off at a timing t4. Then, at the timing t3 at which the reset signal RES is on, the control signals TX1 to TX4 are turned on to reset the signal charges in the photodiode PD1 to PD4.

Furthermore, at a timing t7, the reset signal RES is turned on, and the reset signal RES that is on is turned off at a timing t9. Then, at the timing t8 at which the reset signal RES is on, the control signals TX1 to TX4 are turned on to reset the signal charges in the photodiodes PD1 to PD4.

Figure 10:
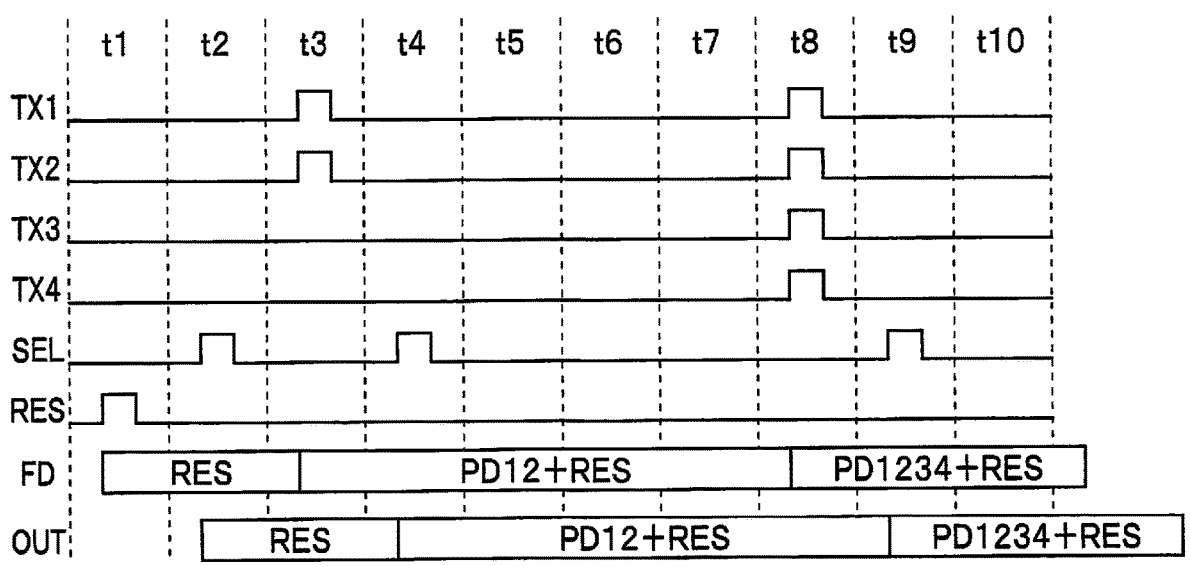
FIG. 10 is a timing chart indicating an example of driving of the image pickup device when pixel signal reading in third reading is performed, in Embodiment 1.

FIG. 10 is a timing chart indicating an example of driving of the image pickup device 4 when pixel signal reading in the third reading is performed.

At a timing t1, the reset signal RES is turned on to reset the floating diffusion FD, and at a timing t2, a voltage of a reset charge (RES) is read.

At a timing t3, signal charges in the photodiodes PD1, PD2 are transferred to the floating diffusion FD, and at a timing t4, charge (PD1 2+RES (here, PD12=PD1+PD2)) is read.

Subsequently, at a timing t8, signal charges in the photodiodes PD1 to PD4 are transferred to the floating diffusion FD, and at a timing t9, charge (PD1234+RES) is read.

Here, where the operation indicated in FIG. 10 is performed, the charge read at the timing t3 and the charge read at the timing t8 may be different from each other in exposure time length. However, the exposure time length difference is very small in comparison with the actual exposure time length (for example, 1/30 seconds to 1/1000 seconds), and such difference may be considered as having almost no substantial effect.

As can be seen from comparison between FIG. 7 and FIG. 10, in the first reading, only an image pixel is read at one time, but in the third reading, it is necessary to perform reading twice, that is, reading of one of a pair of focus detection pixel signals and reading of an image pixel signal. Therefore, a curtain speed of a rolling shutter is higher in the first reading than in the third reading. Also, although not illustrated, as in the second reading, it is necessary to perform reading twice, that is, reading of one of a pair of focus detection pixel signals and the other of the pair of focus detection pixel signals, and thus, the curtain speed of the rolling shutter is higher in the first reading than in the second reading.

Figure 11:
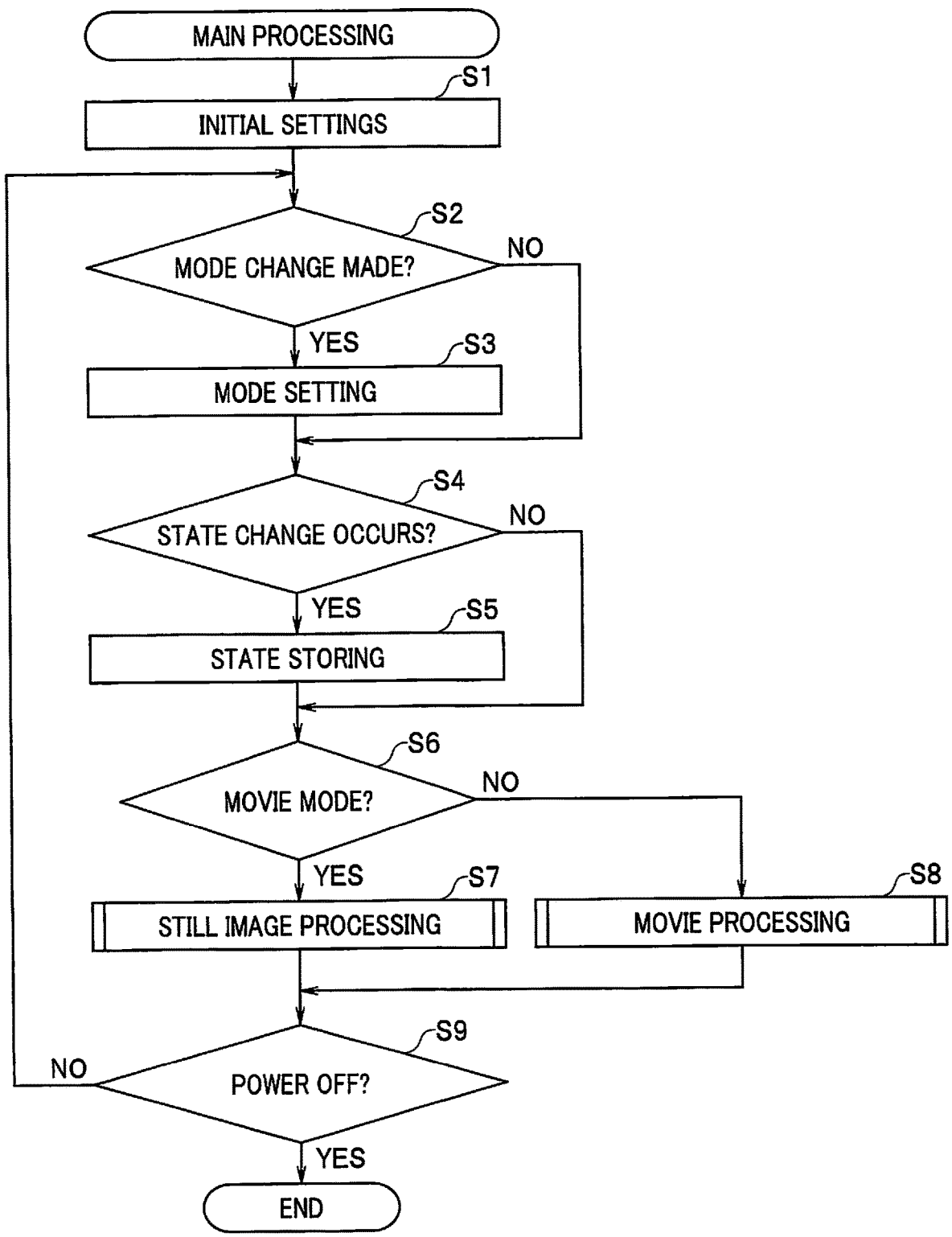
FIG. 11 is a flowchart illustrating operation of the image pickup apparatus according to Embodiment 1.

FIG. 11 is a flowchart illustrating operation of the image pickup apparatus 1. Each operation in FIG. 11 and FIGS. 12 to 14 referred to later is performed by the image pickup apparatus 1 under the control of the system control section 16.

Upon the processing being started by, e.g., a power supply button of the input IF 15 being turned on, power is supplied to the respective sections of the image pickup apparatus 1 to check the respective sections, and initial settings for the image pickup apparatus 1, such as reading, e.g., initial setting parameters (or parameters set by a user last time) and setting the initial setting parameters for the respective sections, are made (step S1).

Then, whether or not the mode of the image pickup apparatus 1 has been changed is determined (step S2). Here, examples of the mode of the image pickup apparatus 1 subject to the change determination include, e.g., the shooting mode (e.g., the still image mode/the moving image mode), the continuous shooting mode/the single shooting mode, and the focus mode (e.g., the SAF mode/the CAF mode/the MF mode).

Here, if it is determined that the mode has been changed, the mode of the image pickup apparatus 1 is set according to the content of the input (step S3).

If step S3 is performed or if it is determined in step S2 that the mode has not been changed, whether or not change in state related to the image pickup apparatus 1 has occurred is determined (step S4). Here, examples of the state related to the image pickup apparatus 1 that is subject to the change determination include, e.g., an optical state (for example, an f-number) of the image pickup lens 2, an object brightness value obtained from an image, movement of the image pickup apparatus 1 obtained from the shake detection section 11 (e.g., movement due to shaking, movement due to panning), movement of an object based on a moving speed of the object detected by the object moving speed detection section 12 and a temperature inside the image pickup apparatus 1, which is acquired from the temperature sensor 10 (however, the state is not limited to these examples).

Then, if it is determined that change in state related to the image pickup apparatus 1 has occurred, the changed state is stored in, for example, the memory 6 (step S5).

If step S5 is performed or if it is determined in step S4 that no state change has occurred, whether the image pickup mode is the still image mode or the moving image mode is determined (step S6). However, here, a case where the image pickup apparatus 1 is set in the image pickup mode is assumed, and processing where the image pickup apparatus 1 is set in, e.g., the replay mode is omitted.

Figure 12:
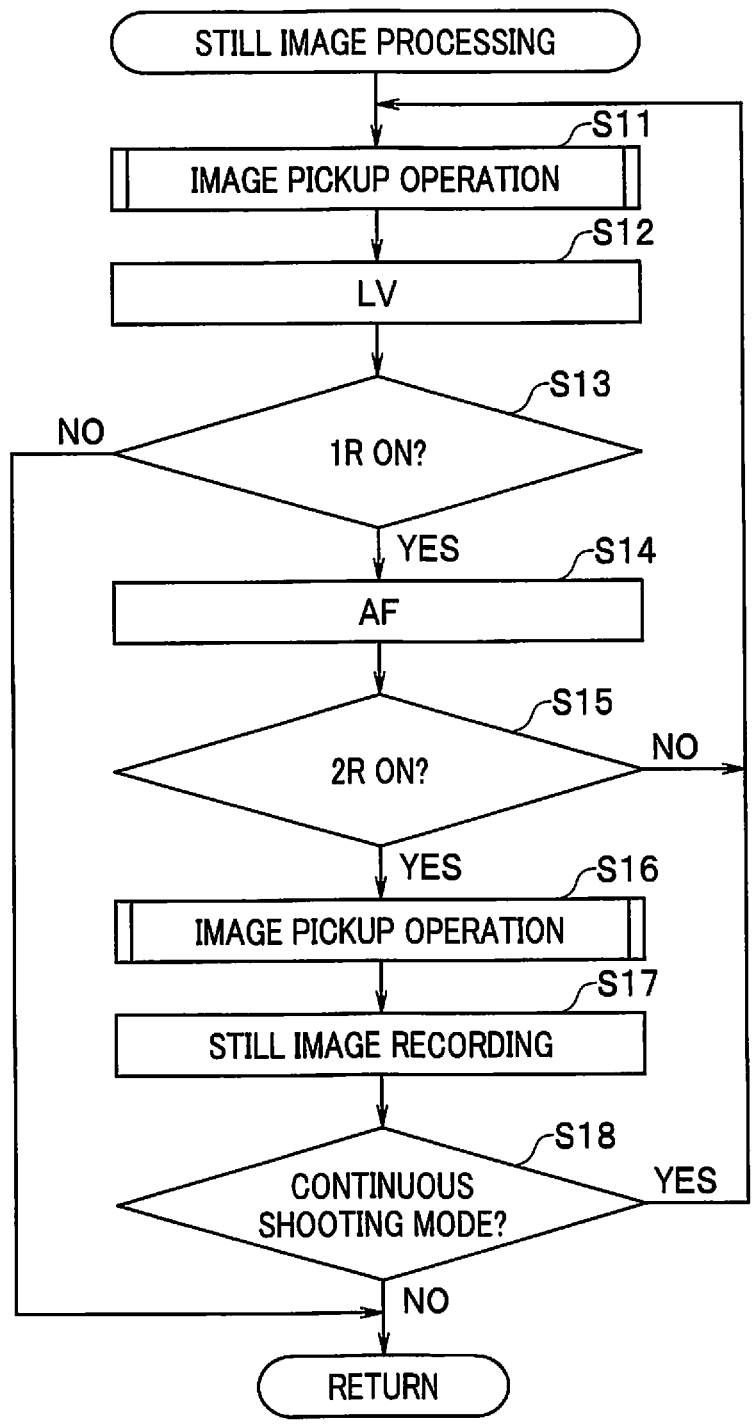
FIG. 12 is a flowchart illustrating the content of still image processing in step S7 in FIG. 11 in Embodiment 1.
Figure 13:
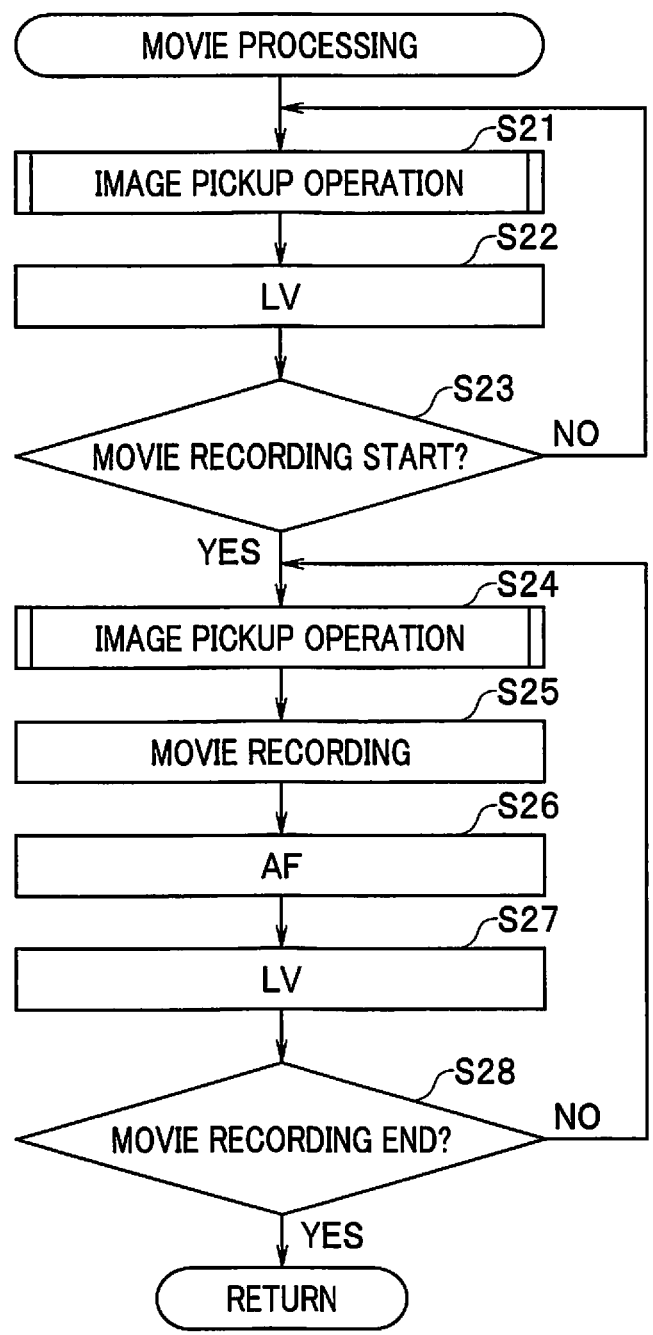
FIG. 13 is a flowchart illustrating the content of movie processing in step S8 in FIG. 11 in Embodiment 1.

If it is determined in step S6 that the image pickup mode is the still image mode, still image processing, which will be described later with reference to FIG. 12, is performed (step S7), and if it is determined that the image pickup mode is the moving image mode, movie processing, which will be described later with reference to FIG. 13, is performed (step S8).

After processing in step S7 or step S8 is performed, whether or not the power supply button of the input IF 15 has been turned off is determined (step S9), and if it is determined that the power supply button of the input IF 15 has not yet been turned off, the processing returns to step S2 and the above-described processing is performed.

On the other hand, if it is determined in step S9 that the power supply button has been turned off; this processing ends.

FIG. 12 is a flowchart illustrating the content of the still image processing in step S7 in FIG. 11.

Figure 14:
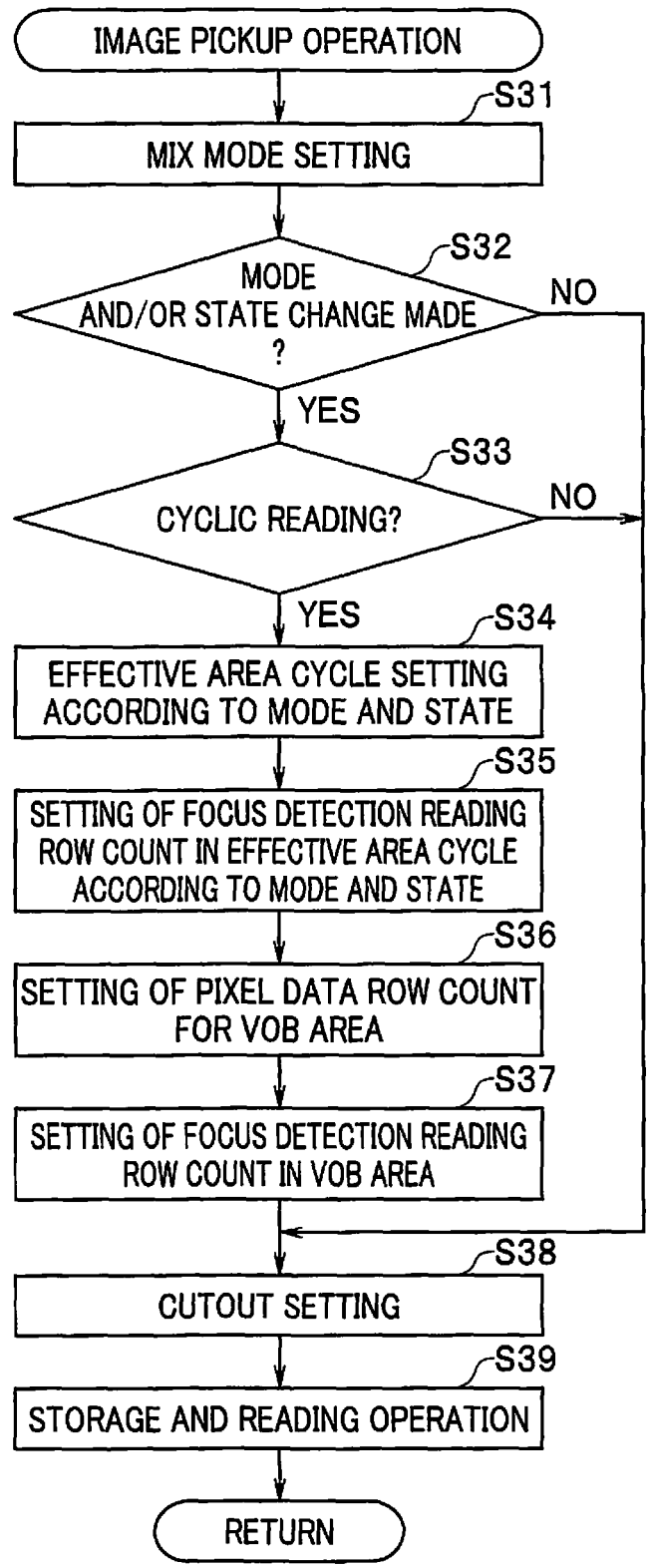
FIG. 14 is a flowchart illustrating the content of image pickup operation in steps S11 and S16 in FIG. 12 and steps S21 and S24 in FIG. 13 in Embodiment 1.

Upon a start of this processing, an image pickup operation, which will be described later with reference to FIG. 14, is performed (step S11).

Then, an image shot in step S11 is subjected to live view image processing by the image signal processing section 9, and a live view of the resulting image is provided on the display section 13 (step S12).

Next, whether or not the first release (1R) switch of the release button is turned on is determined (step S13).

Here, if it is determined that the 1R switch has been turned on, the focus detection signal processing section 8 performs on-sensor phase difference AF or contrast AF based on the image acquired in step S11 for live view (step S14). However, if the focus mode is set to the manual focus (MF) mode, the processing is skipped.

Where the focus detection signal processing section 8 performs on-sensor phase difference AF, if second rows are subjected to the third reading, read pixel signals are, for example, PD12 and PD1234, and focus detection subtraction processing of PD34=PD1234−PD12 (here, PD34=PD3+PD4) is performed by the focus detection subtraction section 7, and a combination of PD12 and PD34 is restored.

Subsequently, whether or not the second release (2R) switch of the release button has been turned on is determined (step S15).

Here, if it is determined that the 2R switch has not been turned on, the processing returns to step S11 and the above-described processing is performed. In the loop from step S11 to step S15 when the 1R switch is continuously on, if the focus mode is set to the single auto focus (SAF) mode, the processing in step S14 for a second time onwards is skipped, and a focal point set immediately after the 1R switch being turned on is maintained.

Also, if it is determined in step S15 that the 2R switch has been turned on, an image pickup operation, which will be described later with reference to FIG. 14, is performed (step S16).

Then, an image shot in step S16 is subjected to still image processing by the image signal processing section 9 and is recorded in the recording section 14 as a still image (step S17).

Subsequently, whether or not the still image mode is the continuous shooting mode in which a plurality of still images are shot continuously (step S18).

Here, if it is determined that the still image mode is the continuous shooting mode, the processing returns to step S11 and the above-described processing is performed to acquire a next continuous image. In the continuous shooting mode, in step S14, predictive AF is performed.

If it is determined in step S18 that the still image mode is not the continuous shooting mode (that is, the single shooting mode in which only one still image is shot) or if it is determined in step S13 that the 1R switch has been turned on, the processing returns to the processing indicated in FIG. 11.

FIG. 13 is a flowchart illustrating the content of the movie processing in step S8 in FIG. 11.

Upon a start of this processing, an image pickup operation, which will be described later with reference to FIG. 14, is performed (step S21).

Then, an image shot in step S21 is subjected to live view image processing by the image signal processing section 9, and a live view of the resulting image is provided on the display section 13 (step S22).

Next, whether or not the movie button in the input IF 15 has been turned on, that is, whether or not movie recording has been started is determined (step S23).

Here, if it is determined that movie recording has not been started, the processing returns to step S21 and the above-described processing is performed.

Also, if it is determined in step S23 that movie recording has been started, an image pickup operation, which will be described later with reference to FIG. 14, is performed (step S24).

Then, an image shot in step S24 is subjected to movie processing by the image signal processing section 9 and then recorded in the recording section 14 as one frame of a movie (step S25).

Furthermore, the focus detection signal processing section 8 performs on-sensor phase difference AF or contrast AF based on the image acquired in step S24 (step S26), and the image signal processing section 9 performs live view image processing, and a live view of the resulting image is provided on the display section 13 (step S27).

Subsequently, whether or not the movie button is turned off that is, whether or not to end the movie recording is determined (step S28).

Here, if it is determined not to end the movie recording, the processing returns to step S24 and the above-described movie shooting is continued.

On the other hand, in step S28, if it is determined to end the movie recording, the processing returns to the processing illustrated in FIG. 11.

FIG. 14 is a flowchart illustrating the content of the image pickup operation in steps S11 and S16 in FIG. 12 and in steps S21 and S24 in FIG. 13.

Upon a start of this processing, the image pickup device 4 sets, e.g., the number of pixels to be added up and a pixel decimation rate for mixing processing in the horizontal direction and the vertical direction in a mix mode under the control of the system control section 16 (step S31).

Next, whether or not at least one of the mode and the state of the image pickup apparatus 1 has been changed is determined (step S32). This determination is made based on, for example, the mode of the image pickup apparatus 1 set in step S3 in FIG. 11 or the change in state related to the image pickup apparatus 1, the change being stored in the memory 6 in step S5.

Here, if it is determined that at least one of the mode and the state of the image pickup apparatus 1 has been changed, whether or not to perform cyclic reading for an image pickup subject frame is determined (step S33).

For example, in the still image shooting or the manual focus (MF) mode, where, e.g., 3D information, a depth map, or depth correction information is not necessary, that is, no focus detection signals are necessary, all image pixel signals may be read by means of the above-described first reading, and thus, no cyclic reading (that is, neither the second reading nor the third reading) is necessary. Therefore, the determination in step S33 is made.

Here, cyclic reading is a control method in which reading for first rows in which the first reading is performed and reading for second rows in which the second reading or the third reading are performed in a cycle in the column direction in one frame.

For example, in FIG. 3, in the effective area 22e, a row range X indicates one cycle, a row range Y indicates a second row group, and a row range Z indicates a first row group. In the following, nx (count of rows in one cycle), ny (count of second rows in one cycle) and nz (count of first rows in one cycle) represent respective counts of rows in the row ranges X, Y, Z.

Then, if it is determined that cyclic reading has been performed, the control circuit sets the row count nx in a reading cycle employed for the effective area 22e (step S34) and sets the row count ny of rows from which focus detection signals are read in one cycle (step S35), according to the mode and the state of the image pickup apparatus 1.

Here, since nx=ny+nz is established, if nx and ny are set, nz is automatically determined. However, instead of setting nx and ny, nx and nz may be set or ny and nz may be set. In this case, more preferably, the device control section 29 (control circuit) including the row counter operation section 30 is controlled so as to satisfy ny<nz (or ny S nz).

Although the above description has been provided in terms of an example in which both nx and ny are set, the present invention is not limited to this example, and only one of nx and ny may be set (for example, the control circuit may perform control so as to change only nx within the range of ny<nz).

For example, in order to adjust accuracy of phase difference AF as necessary, a ratio of rows from which focus detection signals can be acquired, that is, a ratio ny/nx of second rows in one cycle may be changed. Consequently, the control circuit may change nx or nx and ny (however, as described above, nx and nz means the same as nx and ny) so that ny/nx changes according to parameters relating to the image pickup apparatus 1 (likewise, ny and nz may be changed so that at least nx=ny+nz is changed).

Also, although a cycle applied to the effective area 22e is a cycle (fixed cycle) applied to the entire effective area 22e, it does not necessarily exclude a case of different cycles to a part and another part of the effective area 22e. As an example, it is possible to apply a first cycle represented by a set of row counts (nx1, ny1, nz1) for rows in a center part of the effective area 22e and a second cycle represented by a set of row counts (nx2, ny2, nz2) for other rows in the effective area 22e.

Furthermore, since no cyclicity is necessary for the VOB area 22v, the device control section 29 performs control to apply such cycle determined by nx, ny, nz to the effective area 22e but not to apply such cycle to the VOB area 22v.

In other words, the device control section 29 sets a row count na in a row range A of a first row group in the VOB area 22v (step S36) and a row count nb in a row range B of a second row group (step S37).

The row counts na, nb set here may be constant values depending on neither the mode nor the state of the image pickup apparatus 1 (however, the row counts na, nb are not prevented from being changed according to the mode and state of the image pickup apparatus 1).

Also, in order to enhance OB level accuracy, a certain count or more of rows is needed, and thus, even if ny<<nz in the effective area 22e, it is preferable to set the row count na and the row count nb so as to have values relatively close to each other, rather than setting nb<<na.

After step S37, if it is determined in step S32 that no change in mode or state of the image pickup apparatus 1 has occurred or if it is determined in step S33 that no cyclic reading is performed, for example, image cutout setting according to, e.g., an aspect ratio of the image and/or electric zooming is performed (step S38).

Then, under the control of the control circuit including the system control section 16 and the device control section 29, processing for accumulating charge via the image pickup device 4 and reading the charge after a lapse of the exposure time length (step S39) is performed, and the processing returns to the original processing from which the processing is called for.

Here, an amount of distortion when an object moving at a high speed relative to the image pickup apparatus 1 is subjected to shooting via a rolling shutter (what is called rolling shutter distortion) varies depending on the curtain speed of the rolling shutter. Therefore, the row range Z in which first reading with a high curtain speed is performed and the row range Y in which the third reading (or the second reading) with a low curtain speed are different from each other in amount of distortion, and diagonal lines may be jagged (or zigzagged).

Figure 15:
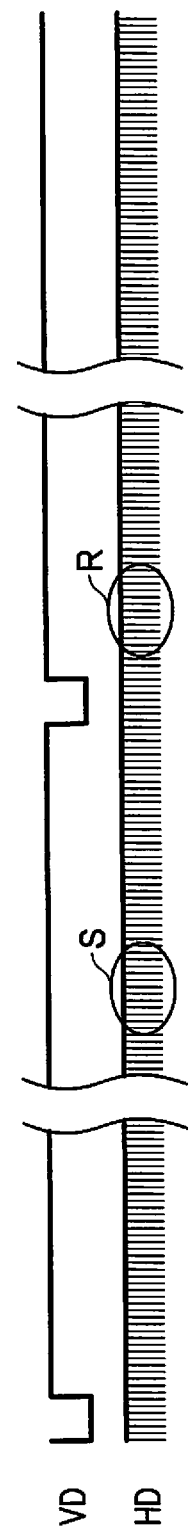
FIG. 15 is a timing chart indicating an example of a part in which an electronic shutter operation is performed and a part in which a reading operation is performed, in a vertical synchronization signal and a horizontal synchronization signal for driving the image pickup device, in Embodiment 1.
Figure 16:
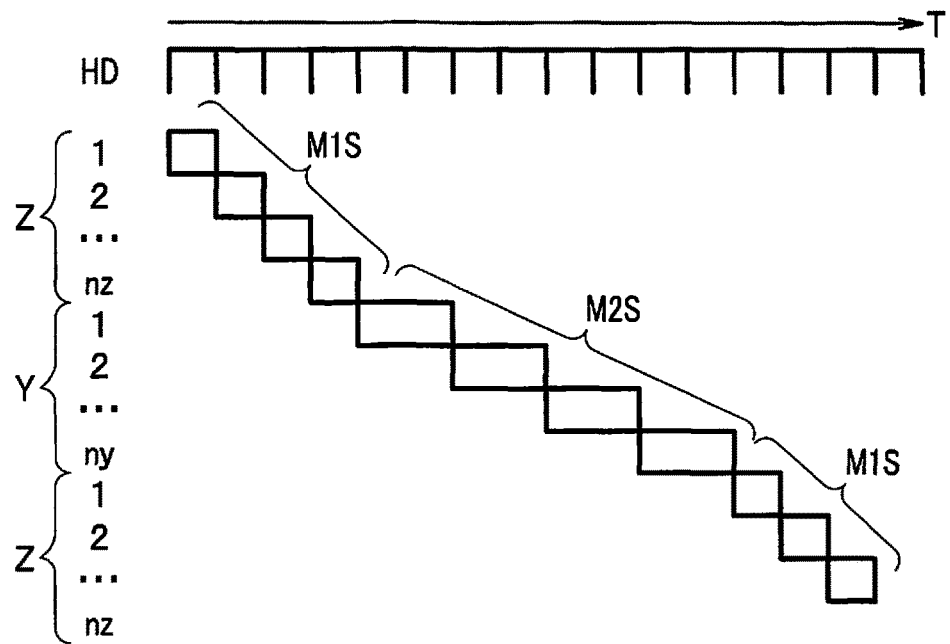
FIG. 16 is a timing chart indicating an enlarged view of a manner of the electronic shutter operation in FIG. 15 in Embodiment 1.
Figure 17:
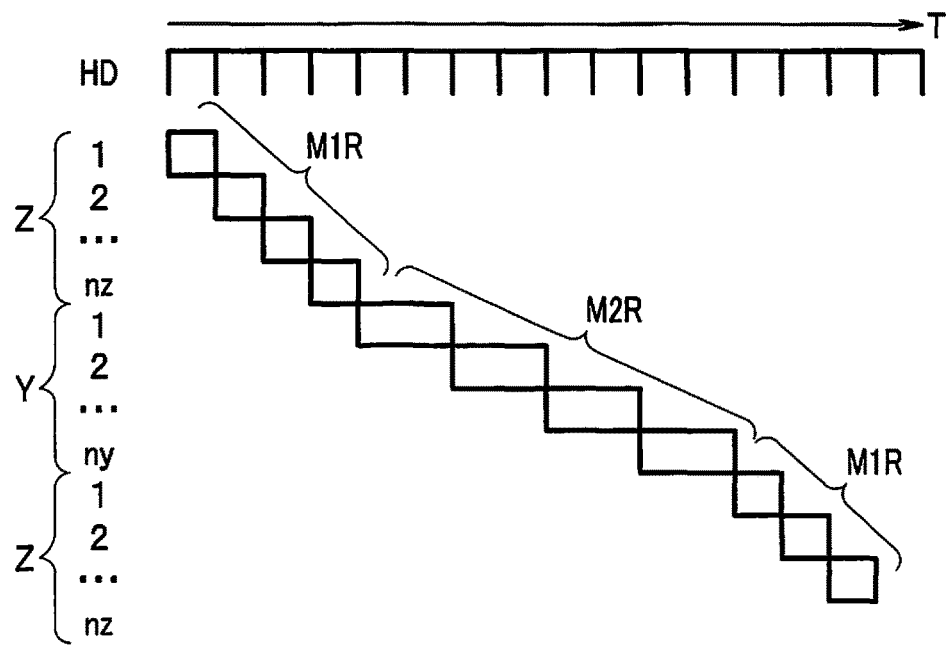
FIG. 17 is a timing chart indicating an enlarged view of a manner of the reading operation in FIG. 15 in Embodiment 1.

Here, FIG. 15 is a timing chart indicating an example of part S in which an electronic shutter operation is performed and part R in which a reading operation is performed, in a vertical synchronization signal VD and a horizontal synchronization signal HD for driving the image pickup device 4. FIG. 16 is a timing chart indicating an enlarged view of a manner of the electronic shutter operation in FIG. 15. FIG. 17 is a timing chart indicating an enlarged view of a manner of the reading operation in FIG. 15 with enlargement. In FIGS. 15 to 17, the rightward direction indicates a direction of progress of time T.

FIG. 16 is an enlarged view of part S in which the electronic shutter operation illustrated in FIG. 15 is performed, and FIG. 17 is an enlarged view of part R in which the reading operation in FIG. 15 is performed.

The electronic shutter operation illustrated in FIG. 16 is controlled so as to be performed at a point of time that is the exposure time length back from the reading operation illustrated in FIG. 17, and thus, the front curtain operation illustrated in FIG. 16 and the rear curtain operation illustrated in FIG. 17 are basically the same in inclination due to change in curtain speed.

Then, since in the row range Z, the first reading with a high curtain speed is performed and in the row range Y, the third reading (or the second reading) with a low curtain speed is performed, movements M1S and M1R of electronic shutter curtains in the row range Z are faster than movements M2S and M2R of the electronic shutter curtains in the row range Y.

Therefore, differences in exposure start timing and exposure end timing between adjacent rows are larger in the row range Y than in the row range Z, that is, an amount of movement of an object relative to the image pickup apparatus 1 during a period of time between a period of time of exposure of a certain row and a period of time of exposure of a row next to the certain row is larger in the row range Y than in the row range Z. Therefore, an inclination of a diagonal line of the object making the relative movement differs between the row range Z and the row range Y, resulting generation of a jag.

In order to make such jag less noticeable, it is preferable to make the row count ny be as small as possible, for example, a minimum value determined by the number of the column ADCs included in the ADC processing section 24 may be set as the row count ny. More specifically, for example, where four column ADCs configured to perform AD conversion of pixel data for one row in parallel are provided, ny=4 is set.

On the other hand, in order to increase the AF accuracy, as described above, a ratio ny/nx of second rows in one cycle may be controlled so as to be brought close to (ny/nx)≈(½) within a range in which (ny/nx)<(½) is satisfied from a state in which (ny/nx)<<(½).

Therefore, from the practical perspective of effective control being performed by reducing the number of types of row counts to be changed, an operation in which only the row count nx in a cycle is changed within a range in which (ny/nx)<(½) is satisfied (that is, a range in which ny<nz is satisfied), with the row count ny fixed to a smallest possible value (for example, a minimum value determined in terms of hardware such as described above), to control the ratio ny/nx is possible.

In the following, some examples of control of the ratio ny/nx by the control circuit with the mode and the state of the image pickup apparatus 1 as parameters will be described.

Figure 18:
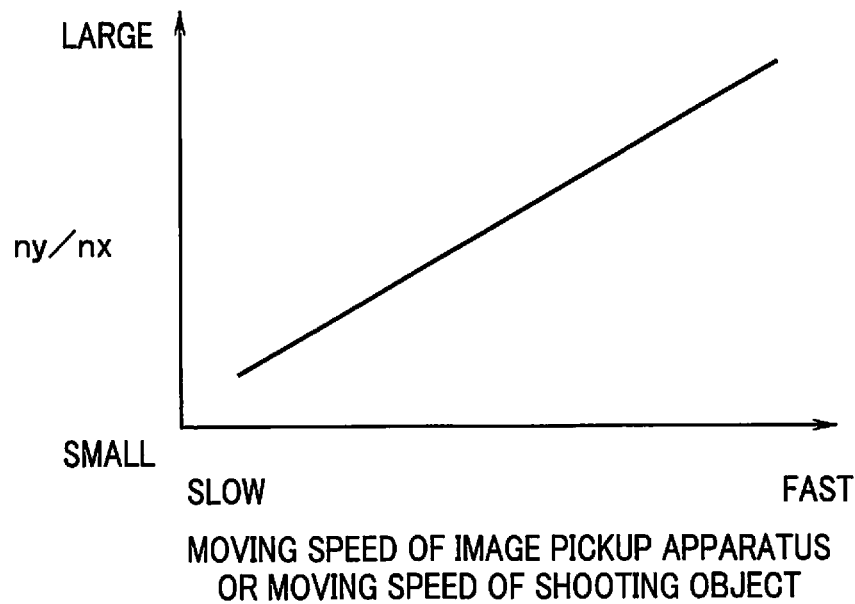
FIG. 18 is a graph indicating an example of control of a ratio ny/nx of second rows in one cycle relative to a moving speed of the image pickup apparatus or an object in Embodiment 1.

FIG. 18 is a graph indicating an example of control of the ratio ny/nx of second rows in one cycle relative to a moving speed of the image pickup apparatus 1 or an object. FIGS. 18 to 24 each roughly indicate a tendency of control of the ratio ny/nx, and thus even if a linear change is indicated in each figure, the change may form a curved shape (or may form a polygonal curve) or may be a stepped change, and thus, the changes are not limited to the changes illustrated in the figures.

In the example indicated in FIG. 18, the control circuit performs control so that the ratio ny/nx increases as a moving speed (parameter) of the image pickup apparatus 1 obtained based on a result of detection by the shake detection section 11 or a moving speed (parameter) of the object detected by the object moving speed detection section 12 becomes faster (speed value increases).

This is because if the moving speed of the image pickup apparatus 1 or the object is fast, AF accuracy should be ensured to follow the object.

It is also possible that the control circuit calculates a moving speed of the object relative to the image pickup apparatus 1 as a parameter using both the moving speed of the image pickup apparatus 1 and the moving speed of the object and performs control so that the ratio ny/nx increases as the relative moving speed becomes faster (speed value increases).

Figure 19:
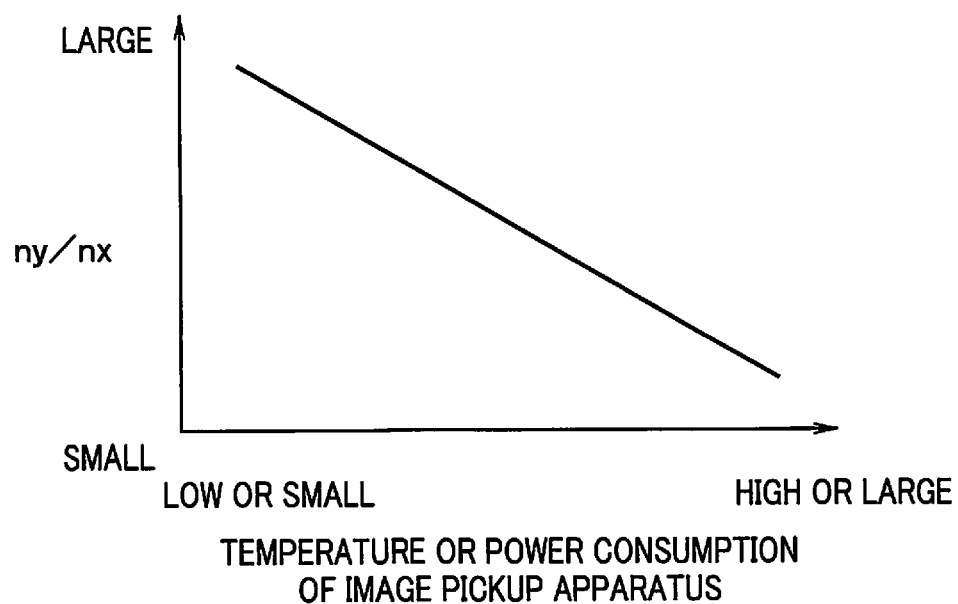
FIG. 19 is a graph indicating an example of control of the ratio ny/nx of second rows in one cycle relative to a temperature or power consumption of the image pickup apparatus in Embodiment 1.

FIG. 19 is a graph indicating an example of control of the ratio ny/nx of second rows in one cycle relative to a temperature or power consumption of the image pickup apparatus 1.

In the example indicated in FIG. 19, the control circuit performs control so that the ratio ny/nx decreases as a temperature (parameter) of the image pickup apparatus 1 acquired from the temperature sensor 10 or power consumption (parameter) of the image pickup apparatus 1 obtained based on power supply control by the system control section 16 becomes larger (power value increases).

Since second rows in which reading is performed twice consume a larger amount of power than first rows in which reading is performed once, that is, second rows generate a large amount of heat and thus increases the temperature of the image pickup apparatus 1, the ratio ny/nx of second rows is decreased to suppress an increase in temperature and power consumption.

During moving shooting or continuous shooting, power consumption is large and thus the temperature of the image pickup apparatus 1 may increase, and thus, the control in FIG. 19 is suitable.

Figure 20:
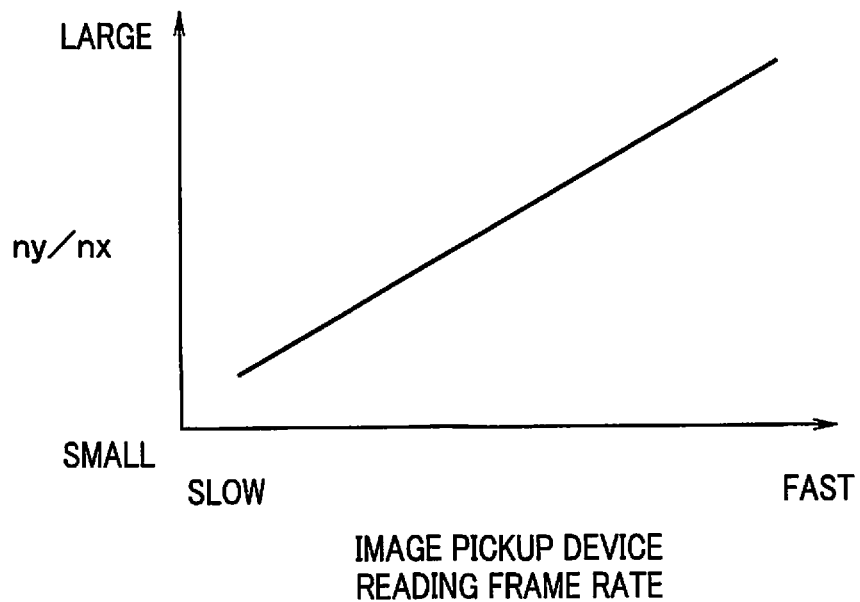
FIG. 20 is a graph indicating an example of control of the ratio ny/nx of second rows in one cycle relative to a reading frame rate of reading from the image pickup device in Embodiment 1.

FIG. 20 is a graph indicating an example of control of the ratio ny/nx of second rows in one cycle relative to a reading frame rate of reading from the image pickup device 4.

In the example indicated in FIG. 20, under the control of the system control section 16, the control circuit performs control so that the ratio ny/nx increases as a reading frame rate (parameter) set for the image pickup device 4 becomes faster (value of the reading frame rate increases).

Where the reading frame rate is made to be faster, processing for increasing the number of pixels to be mixed (the number of pixels to be added up or a pixel decimation rate) in mixing processing is performed. In this case, as the number of pixels to be mixed is larger, a pitch of the focus detection pixels in a screen becomes larger, resulting in a decrease in phase difference detection accuracy. Therefore, as the reading frame rate becomes faster, the ratio ny/nx is increased to suppress a decrease in phase difference detection accuracy.

Figure 21:
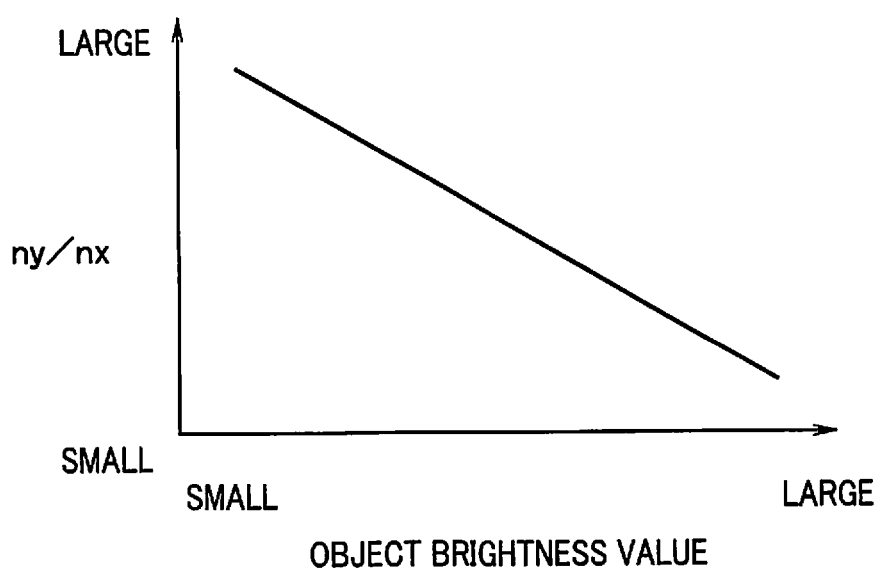
FIG. 21 is a graph indicating an example of control of the ratio ny/nx of second rows in one cycle relative to a brightness value of the object in Embodiment 1.

FIG. 21 is a graph indicating an example of control of the ratio ny/nx of second rows in one cycle relative to a brightness value of the object.

In the example illustrated in FIG. 21, the control circuit performs control so that the ratio ny/nx decreases as a brightness value (parameter) of the object acquired by the system control section 16 from the image signal processing section 9 becomes larger (increases).

If the brightness value of the object is large, rolling shutter distortion become noticeable, and thus, the ratio ny/nx is decreased to suppress rolling shutter distortion. On the other hand, if the brightness value of the object is small, S/N of the focus detection pixel signals is lowered, and consequently, the AF accuracy is decreased, and thus, if the brightness value of the object is small, the ratio ny/nx of second rows is increased and AF is performed based on a larger amount of data to suppress a decrease in AF accuracy.

Figure 22:
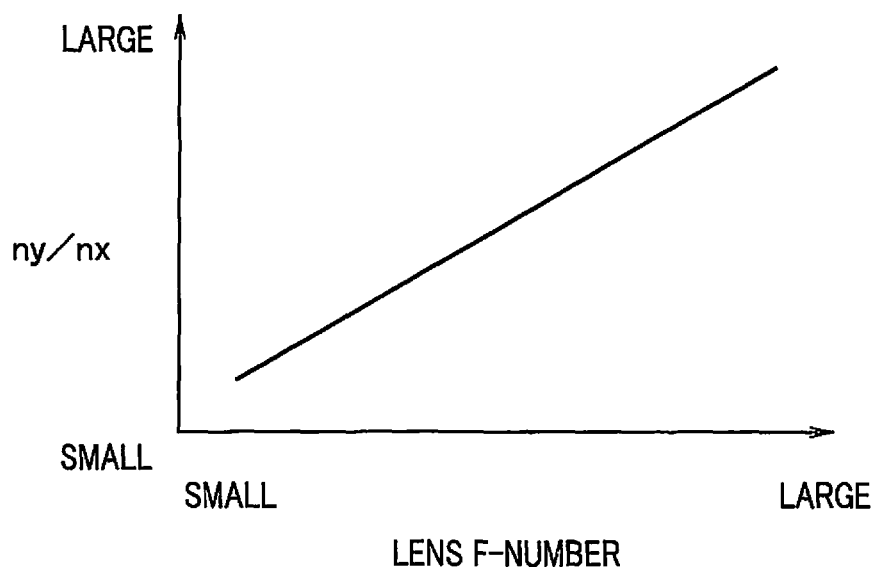
FIG. 22 is a graph indicating an example of control of the ratio ny/nx of second rows in one cycle relative to an f-number of an image pickup lens in Embodiment 1.

FIG. 22 is a graph indicating an example of control of the ratio ny/nx of second rows in one cycle relative to an f-number of the image pickup lens 2.

In the example illustrated in FIG. 22, the control circuit performs control so that the ratio ny/nx increases as an f-number (parameter) set for the image pickup lens 2 under the control of the system control section 16 becomes larger (increases) (that is, an amount of light entering the image pickup device 4 per unit of time decreases).

As the f-number is smaller, a depth of field is shallow, but a coefficient of conversion of a value of a distance between two images, which is obtained as a result of phase difference detection, into a defocusing amount becomes smaller at a higher rate in principle. Where the coefficient is small, even if an error occurs in phase difference detection, an effect of such error is small, and thus, it is not necessary to specifically enhance accuracy in phase difference detection. On the other hand, if the f-number is large, the coefficient is large and an error in phase difference detection affects the accuracy. Therefore, as the f-number becomes larger, the ratio ny/nx is increased to perform phase difference detection based on a larger amount of data to suppress a decrease in detection accuracy.

FIG. 23 is a table indicating an example of control of the ratio ny/nx of second rows in one cycle relative to a mode of the image pickup apparatus 1.

In the example indicated in FIG. 23, if a mode (parameter) of the image pickup apparatus 1 set by the system control section 16 is the still image shooting mode, the ratio ny/nx is made to be small, and if the mode of the image pickup apparatus 1 is the movie shooting mode and if the mode of the image pickup apparatus 1 is the live view (LV) mode, the control circuit performs control so as to make the ratio ny/nx larger than the ratio ny/nx in a case where the mode of the image pickup apparatus 1 is the still image shooting mode.

Here, in the movie shooting mode and the LV mode, a ratio ny/nx necessary to ensure AF accuracy to follow an object is secured, but in the still image shooting mode, the ratio ny/nx is made to be small in priority to image quality. The movie shooting mode and the LV mode may be different from each other in ratio ny/nx.

FIG. 24 is a table indicating an example of control of the ratio ny/nx of second rows in one cycle relative to a focus mode.

In the example illustrated in FIG. 24, the control circuit performs control so that if a focus mode (parameter) of the image pickup apparatus 1 set by the system control section 16 is the manual focus (MF) mode, the ratio ny/nx is made to be small, and if the focus mode of the image pickup apparatus 1 is the single auto focus (SAF) mode and if the focus mode of the image pickup apparatus 1 is the continuous auto focus (CAF) mode, the ratio ny/nx is made to be larger than the ratio ny/nx in a case where the focus mode of the image pickup apparatus 1 is the MF mode.

In the SAF mode and the CAF mode, the ratio ny/nx is made to be large because it is necessary to keep AF accuracy, but in the MF mode, no AF is performed and thus the ratio ny/nx is made to be small in priority to image quality. The SAF mode and the CAF mode may be different from each other in ratio ny/nx.

Also, FIGS. 18 to 22 indicate, with the ratio ny/nx determined according to the mode of the image pickup apparatus 1 indicated in FIG. 23 (or the focus mode indicated in FIG. 24) as a base, how the base ratio ny/nx changes according to the respective parameters. Furthermore, the inclinations of the graphs in FIGS. 18 to 22 are set so as to vary depending on the image pickup mode or the focus mode.

For example, the control indicated in FIGS. 18 to 22 is suitably employed when phase difference detection for still image shooting is performed. However, where still image shooting is performed using not a mechanical shutter but an electronic shutter, no control of the ratio ny/nx based on the parameters may be performed or change of the ratio ny/nx may be made to be smaller than change of the ratio ny/nx at the time of phase difference detection for still image shooting in order to suppress a decrease in image quality due to rolling shutter distortion. For example, where still image continuous shooting is performed using an electronic shutter, in an image pickup operation for AF (step S11 in FIG. 12), control of the ratio ny/nx based on the parameters is performed, and in an image pickup operation for still image (step S16 in FIG. 12), no control of the ratio ny/nx is performed. Consequently, AF accuracy for a moving object is ensured and a decrease in image quality of a still image due to rolling shutter distortion is suppressed. Likewise, during movie shooting, change in the ratio ny/nx may be smaller than the change during phase difference detection for still image shooting.

Then, the present invention is not limited to a case where one parameter is used in order to determine the ratio ny/nx, and it should be understood that a plurality of parameters may be used in combination. Where a plurality of parameters are provided and a plurality of ratios ny/nx are determined according to the plurality of parameters such as described above, the control circuit may select and set a ratio ny/nx having a smallest value from among the plurality of ratios ny/nx. Consequently, jags of diagonal lines due to rolling shutter distortion can be made to be as little noticeable as possible.

According to Embodiment 1 described above, a cycle in a column direction of first rows and second rows in one frame is controlled, rows from which focus detection pixel signals are read are cyclically dispersed in one frame, enabling making jags of diagonal lines due to rolling shutter distortion less noticeable while a length of reading time being reduced. Then, phase difference AF can be performed while power consumption being reduced. In addition, since processing is performed with some ingenuity taken in the control, it is not necessary to, e.g., add a complicated circuit, enabling suppression of cost increase.

Also, since nx is changed within the range of ny<nz, rows from which focus detection pixel signals are read are limited, enabling effectively shortening of the length of reading time and thus enabling, e.g., enhancement in frame rate.

Furthermore, since nx or nx and ny are changed according to a parameter to change ny/nx, unnoticeability of jags of diagonal lines due to rolling shutter distortion can effectively be controlled.

Since where a plurality of ratios ny/nx are determined according to a plurality of parameters, a ratio ny/nx having a smallest value from among the plurality of ratios ny/nx is selected and set, enabling making a selection to make jags most unnoticeable.

For example, if ny/nx is increased as the moving speed of the image pickup apparatus 1 or the moving speed of the object becomes faster (speed value increases), AF accuracy can be ensured to follow the object.

Also, if ny/nx is increased as the reading frame rate of reading from the image pickup device 4, which is the image pickup section (value of the reading frame rate increases), a decrease in phase difference detection accuracy due to mixing processing can be suppressed.

If ny/nx is increased as the f-number of the image pickup lens 2 becomes larger (increases), a decrease in phase difference detection accuracy when the f-number is large can be suppressed.

On the other hand, if ny/nx is decreased as the temperature of the image pickup apparatus 1 becomes higher or power consumption of the image pickup apparatus 1 becomes larger (power value increases), the number of second rows subjected to reading twice is reduced, enabling suppression of temperature and power consumption increase.

If ny/nx is decreased as the brightness value of the object becomes larger (increases), rolling shutter distortion, which is noticeable when the brightness value of the object is large, can be suppressed, and a decrease in AF accuracy when the brightness value of the object is small, that is, the object is dark can be suppressed.

If ny/nx is made to be larger in the movie shooting mode and the live view (LV) mode than in the still image shooting mode, in the still image shooting mode, quality of an image can be prioritized, enabling prioritizing AF accuracy and maintaining accuracy of AF in following an object in the movie shooting mode and the LV mode.

Since ny/nx is made to be larger in the SAF mode and in the CAF mode than in the MF mode, image quality can be prioritized in the MF mode in which no AF is performed, and in the SAF mode and the CAF mode, AF accuracy can be prioritized, ensuring highly-accurate phase difference AF.

Then, since the cycle in a column direction of first rows and second rows in one frame is not applied to the VOB area 22v, each of OB data for first rows and OB data for second rows can be acquired with good accuracy.

The above-described processing in the respective sections may be performed by one or more processors configured as hardware. For example, the sections each may be a processor configured as an electronic circuit or may be respective circuit portions in a processor configured by an integrated circuit such as a field-programmable gate array (FPGA). Alternatively, a processor including one or more CPUs may be configured to perform functions as the respective sections by reading and executing a processing program recorded on a recording medium.

Also, although the above description has been given mainly in terms of an image pickup apparatus, the present invention is applicable to, e.g., any of a control method for controlling an image pickup apparatus in such a manner described above, a processing program for causing a computer to perform processing that is similar to the processing performed by the image pickup apparatus and a computer-readable non-transitory recording medium recording the processing program.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image pickup apparatus comprising:
   an image pickup device including a pixel region in which image pixels corresponding to microlenses are arrayed in a matrix, each of the image pixels being divided into a plurality of focus detection pixels configured to perform photoelectric conversion of a light flux passing through a plurality of regions resulting from division of an exit pupil of a shooting optical system, to generate respective photoelectric conversion signals, each of the image pixels generating an image pixel signal and focus detection pixel signals based on the photoelectric conversion signals, the pixel region defining a plurality of horizontal rows of imaging pixels and a plurality of vertical columns of image pixels; and
   a control circuit configured to control at least one cycle, each of the at least one cycle defined by
      a first group of one or more rows in which a first type of reading is performed, the first type of reading including adding up all the photoelectric conversion signals generated in one of the image pixels to generate the image pixel signal and reading the generated image pixel signal only, and
      a second group of one or more rows in which a second type of reading or a third type of reading is performed, the second type of reading including generating both of a pair of the focus detection pixel signals in a pupil division direction based on the photoelectric conversion signals and reading both of the pair of the focus detection pixel signals, the third type of reading including generating and reading one of the pair of the focus detection pixel signals and the image pixel signal,
   in one frame,
   wherein nx is a whole number count of rows in one of the at least one cycle, nz is a whole number count of rows in the first group of one or more rows in one cycle and ny is a whole number count of rows in the second group of one or more rows in one cycle, nx=ny+nz, and
   wherein the control circuit performs further control so as to change a ratio of ny to nx.

2. The image pickup apparatus according to claim 1, wherein the control circuit changes nx, or nx and ny so that at least one ratio of ny/nx changes according to at least one parameter related to the image pickup apparatus.

3. The image pickup apparatus according to claim 2, wherein when the at least one parameter is provided in plurality and the at least one ratio of ny/nx is determined in plurality according to the at least one parameter in plurality, the control circuit selects and sets a smallest value of ny/nx in the at least one ratio of ny/nx in plurality.

4. The image pickup apparatus according to claim 2, wherein:
   the control circuit changes nx or nx and ny so that the at least one ratio of ny/nx increases as a value of the at least one parameter increases; and
   the at least one parameter is at least one of a moving speed of the image pickup apparatus, a moving speed of an object, a reading frame rate of reading from the image pickup device, and an f-number of the shooting optical system.

5. The image pickup apparatus according to claim 2, wherein:

the control circuit changes nx or nx and ny so that the at least one ratio of ny/nx decreases as a value of the at least one parameter increases; and the at least one parameter is at least one of a temperature of the image pickup apparatus, power consumption of the image pickup apparatus, and a brightness value of an object.

6. The image pickup apparatus according to claim 2, wherein:

a mode of the image pickup apparatus can be set to any one of a still image shooting mode, a movie shooting mode, and a live view mode; and when the mode included in the at least one parameter is the movie shooting mode and when the mode is the live view mode, the control circuit changes nx or nx and ny so that the at least one ratio of ny/nx becomes larger than the at least one ratio of ny/nx when the mode is the still image shooting mode.

7. The image pickup apparatus according to claim 2, wherein:

a focus mode of the image pickup apparatus can be set to any of a manual focus mode, a single auto focus mode and a continuous auto focus mode; and when the focus mode included in the at least one parameter is the single auto focus mode and when the focus mode is the continuous auto focus mode, the control circuit changes nx or nx and ny so that the at least one ratio of ny/nx becomes larger than the at least one ratio of ny/nx when the focus mode is the manual focus mode.

8. The image pickup apparatus according to claim 1, wherein:

the pixel region includes an effective pixel region that a light flux from the shooting optical system reaches, and a vertical optical black region in which the light flux from the shooting optical system is blocked off, the vertical optical black region being provided in rows that are different from rows of the effective pixel region; and the control circuit performs the control to the effective pixel region, but not the vertical optical black region.

9. A method for controlling an image pickup apparatus including an image pickup device including a pixel region in which image pixels corresponding to microlenses are arrayed in a matrix, each of the image pixels being divided into a plurality of focus detection pixels configured to perform photoelectric conversion of a light flux passing through a plurality of regions resulting from division of an exit pupil of a shooting optical system, to generate respective photoelectric conversion signals, each of the image pixels generating an image pixel signal and focus detection pixel signals based on the photoelectric conversion signals, the pixel region defining a plurality of horizontal rows of imaging pixels and a plurality of vertical columns of image pixels, the method comprising:

performing a first type of reading including adding up all the photoelectric conversion signals generated in one of the image pixels to generate the image pixel signal and reading the generated image pixel signal only, in a first group of one or more rows;

performing a second type of reading or a third type of reading, the second type of reading including generating both of a pair of the focus detection pixel signals in a pupil division direction based on the photoelectric conversion signals and reading both of the pair of the focus detection pixel signals, the third type of reading including generating and reading one of the pair of the focus detection pixel signals and the image pixel signal, in a second group of one or more rows; and controlling at least one cycle in a column direction, each of the at least one cycle defined by the first group of one or more rows and the second group of one or more rows, in one frame, wherein nx is a whole number count of rows in one of the at least one cycle, nz is a whole number count of rows in the first group of one or more rows in one cycle and ny is a whole number count of rows in the second group of one or more rows in one cycle, nx=ny+nz, and wherein the method includes performing further control so as to change a ratio of ny to nx.

10. The image pickup apparatus control method according to claim 9, wherein nx, or nx and ny are changed so that at least one ratio of ny/nx changes according to at least one parameter related to the image pickup apparatus.

11. The image pickup apparatus control method according to claim 10, wherein when the at least one parameter is provided in plurality and the at least one ratio of ny/nx is determined in plurality according to the at least one parameter in plurality, a smallest value of ny/nx in the at least one ratio of ny/nx in plurality is selected and set.

12. The image pickup apparatus control method according to claim 10, wherein nx or nx and ny are changed so that the at least one ratio of ny/nx increases as a value of the at least one parameter increases, and the at least one parameter is at least one of a moving speed of the image pickup apparatus, a moving speed of an object, a reading frame rate of reading from the image pickup device, and an f-number of the shooting optical system.

13. The image pickup apparatus control method according to claim 10, wherein nx or nx and ny are changed so that the at least one ratio of ny/nx decreases as a value of the at least one parameter increases, and the at least one parameter is at least one of a temperature of the image pickup apparatus, power consumption of the image pickup apparatus and a brightness value of an object.

14. A computer-readable non-transitory recording medium recording a program for causing a computer to control an image pickup apparatus including an image pickup device including a pixel region in which image pixels corresponding to microlenses are arrayed in a matrix, each of the image pixels being divided into a plurality of focus detection pixels configured to perform photoelectric conversion of a light flux passing through a plurality of regions resulting from division of an exit pupil of a shooting optical system, to generate respective photoelectric conversion signals, each of the image pixels generating an image pixel signal and focus detection pixel signals based on the photoelectric conversion signals, the pixel region defining a plurality of horizontal rows of imaging pixels and a plurality of vertical columns of image pixels, the program causing the computer to:

perform a first type of reading including adding up all the photoelectric conversion signals generated in one of the image pixels to generate the image pixel signal and reading the generated image pixel signal only, in a first group of one or more rows;

perform a second type of reading or a third type of reading, the second type of reading including generating both of a pair of the focus detection pixel signals in a pupil division direction based on the photoelectric conversion signals and reading both of the pair of the focus detection pixel signals, the third type of reading including generating and reading one of the pair of the focus detection pixel signals and the image pixel signal, in a second group of one or more rows; and control at least one cycle in a column direction, each of the at least one cycle defined by the first group of one or more rows and the second group of one or more rows, in one frame, wherein nx is a whole number count of rows in one of the at least one cycle, nz is a whole number count of rows in the first group of one or more rows in one cycle and ny is a whole number count of rows in the second group of one or more rows in one cycle, nx=ny+nz, and wherein the program causes the computer to perform further control so as to change a ratio of ny to nx.

15. The computer-readable non-transitory recording medium recording the program according to claim 14, wherein the program causes the computer to change nx, or nx and ny so that at least one ratio of ny/nx changes according to at least one parameter related to the image pickup apparatus.

16. The computer-readable non-transitory recording medium recording the program according to claim 15, wherein when the at least one parameter is provided in plurality and the at least one ratio of ny/nx is determined in plurality according to the at least one parameter in plurality, the program causes the computer to select and set a smallest value of ny/nx in the at least one ratio of ny/nx in plurality.

17. The computer-readable non-transitory recording medium recording the program according to claim 15, wherein:

the program causes the computer to change nx or nx and ny so that the at least one ratio of ny/nx increases as a value of the at least one parameter increases; and the at least one parameter is at least one of a moving speed of the image pickup apparatus, a moving speed of an object, a reading frame rate of reading from the image pickup device, and an f-number of the shooting optical system.

* * * * *